(12) United States Patent
Muraguchi et al.

(10) Patent No.: US 7,309,457 B2
(45) Date of Patent: Dec. 18, 2007

(54) CHAIN INORGANIC OXIDE FINE PARTICLE GROUPS

(75) Inventors: Ryo Muraguchi, Kitakyushu (JP);
Masayuki Matsuda, Kitakyushu (JP);
Hiroyasu Nishida, Kitakyushu (JP);
Toshiharu Hirai, Kitakyushu (JP);
Mitsuaki Kumazawa, Kitakyushu (JP)

(73) Assignee: Catalysts & Chemicals Industries Co., Ltd., Kanagawa (JP)

( * ) Notice: Subject to any disclaimer, the term of this patent is extended or adjusted under 35 U.S.C. 154(b) by 388 days.

(21) Appl. No.: 10/981,845

(22) Filed: Nov. 5, 2004

(65) Prior Publication Data

US 2005/0116205 A1 Jun. 2, 2005

(30) Foreign Application Priority Data

Nov. 6, 2003 (JP) ............................. 2003-376812
Dec. 25, 2003 (JP) ............................. 2003-430414

(51) Int. Cl.
*H01B 1/00* (2006.01)
*H01B 1/02* (2006.01)
*H01B 1/08* (2006.01)

(52) U.S. Cl. ..................... 252/500; 252/518.1; 423/87; 423/592.1; 423/518

(58) Field of Classification Search ................ 252/500, 252/518.1; 423/87, 617, 592.1
See application file for complete search history.

(56) References Cited

U.S. PATENT DOCUMENTS

| 3,860,523 A |   | 1/1975 | Petrow et al. |         |
|-------------|---|--------|---------------|---------|
| 4,457,973 A | * | 7/1984 | Matsui et al. | 428/372 |
| 4,533,538 A | * | 8/1985 | Kobashi et al.| 423/617 |

FOREIGN PATENT DOCUMENTS

| JP | 48-78094 B    | 10/1973 |
| JP | 60-041536 A   | 3/1985  |
| JP | 60-137828 A   | 7/1985  |
| JP | 61-227918 A   | 10/1986 |
| JP | 61-227919 A   | 10/1986 |
| JP | 02-001717 A   | 1/1990  |
| JP | 02-180717 A   | 7/1990  |
| JP | 07-133105 A   | 5/1995  |
| JP | 11-061043 A   | 3/1999  |
| JP | 2002-079616 A | 3/2002  |

OTHER PUBLICATIONS

Zhang, Zaoli. "Synthesis and microstrucute of antimony oxide nanorods." J. Mater. Res., 2002, 17, 1698.*
Satishkumar et al. "Synthesis of metal oxide nanorods using carbon nanotubes as templates." J. Mater. Chem., 2000, 2115.*
Guo et al. "Synthesis of novel Sb2O3 and Sb2O5 nanorods." Chem. Phys. Let., 2000, 318, 49.*
Ye et al. "A facile vapor-solid synthetic route to Sb2O3 fibrils and tubules." Chem. Phys. Let., 2002, 363, 34.*
Xiong et al. "Controlled growth of Sb2O5 nanoparticles and their use as polymer electrolyte fillers." J. Mater. Chem., 2003, 13, 1994.*

* cited by examiner

*Primary Examiner*—Mark Kopec
*Assistant Examiner*—Tri Nguyen
(74) *Attorney, Agent, or Firm*—The Webb Law Firm, P.C.

(57) ABSTRACT

A chain antimony oxide fine particle group comprising antimony oxide fine particles which have an average particle diameter of 5 to 50 nm, are connected in the form of a chain and have an average connection number of 2 to 30 and preferably used for forming a hard coating film. The fine particle group can be prepared by a process comprising treating an alkali antimonate aqueous solution with a cation exchange resin to prepare an antimonic acid (gel) dispersion and then treating the dispersion with an anion exchange resin and/or adding a base to the dispersion. Also provided is a substrate with a film comprising a substrate and a hard coating film. The hard coating film includes a chain inorganic oxide fine particle group, in which inorganic oxide fine particles of 2 to 30 on the average are connected in the form of a chain, and a matrix. The inorganic oxide particles may be silica particles, silica-alumina particles being preferable, and porous particles and/or hollow particles having a cavity inside being more preferable.

3 Claims, No Drawings

CHAIN INORGANIC OXIDE FINE PARTICLE GROUPS

FIELD OF THE INVENTION

The present invention relates to chain inorganic oxide fine particle groups, a process for preparing a dispersion of the fine particle groups, and uses of the fine particle groups.

More particularly, the invention relates to chain antimony-oxide fine particle groups comprising antimony oxide fine particles (colloids) which have an extremely small average particle diameter and an extremely narrow particle diameter distribution and are connected in the form of a chain, and uses of the fine particle groups.

The present invention also relates to a substrate with a hard coating film, which comprises a substrate and a film (hard coating film) formed on a surface of the substrate, said film comprising a matrix component and inorganic oxide particle groups in each of which inorganic oxide fine particles of 2 to 30 on the average are connected in the form of a chain.

BACKGROUND OF THE INVENTION

Antimony oxide fine particles are used as flame retardants for plastics, fabrics, fibers and the like, coating agents for plastics and glasses, and materials of transparent films having antistatic properties, electromagnetic wave screening function or the like, and they are also known to have electrical conductivity. As processes for preparing an antimony oxide sol containing such antimony oxide fine particles, various processes are already known.

For example, in Japanese Patent Publication No. 11848/1982, there is disclosed a process for preparing a colloidal sol of $Sb_2O_3$ having particle diameters of 2 to 100 nm, comprising allowing $Sb_2O_3$ to react with KOH and $H_2O_2$ in a molar ratio of about 1:2.1:2 ($Sb_2O_3$:KOH:$H_2O_2$) to form potassium antimonate and then performing deionization. It is also known that, in the formation of a colloidal sol of antimony oxide by the reaction of antimony trioxide with hydrogen peroxide, if an inorganic alkali substance, such as Li, K, Na, Mg, Ca, Ba or sodium phosphate, is added to the reaction system in an amount of 1.5 to 30% by mol based on $Sb_2O_3$, the rate of the reaction of $Sb_2O3$ with $H_2O_2$ is accelerated and colloidal antimony oxide having extremely small particle diameter is obtained. In Japanese Patent Laid-Open Publication No. 137828/1985, there is described a process for preparing chemically stable colloidal antimony oxide having extremely small particle diameter, said process being characterized in that the molar ratio between $Sb_2O_3$ and $H_2O_2$ is set to 1:2.25-1.8 and an inorganic alkali substance is added to the reaction system in the formation of a colloidal sol of antimony oxide by the reaction of $Sb_2O_3$ with $H_2O_2$.

In Japanese Patent Laid-Open Publication No. 41536/1985, it is disclosed that a stable antimony pentaoxide sol of high concentration and low viscosity is obtained by a process comprising allowing alkali antimonate to react with a monovalent or divalent inorganic acid in a stoichiometric amount of 0.7 to 5 times to form an antimony pentaoxide gel, then separating the gel, washing the gel with water and peptizing the gel by an organic base such as amine.

In Japanese Patent Laid-Open Publication No. 227918/1986, there is disclosed that, in a process for preparing an antimony pentaoxide gel comprising peptizing an antimony pentaoxide sol obtained by the reaction of alkali antimonate with a monovalent or divalent inorganic acid, if phosphoric acid is added in the reaction stage and/or the peptization stage so that the $P_2O_5/Sb_2O_3$ wt % should become 0.2 to 5%, an antimony pentaoxide sol having excellent stability is obtained in the formation of an organosol by solvent replacement with an organic solvent.

In Japanese Patent Laid-Open Publication No. 227919/1986, there is disclosed a process for preparing an antimony pentaoxide sol, in which an antimony pentaoxide sol wherein surfaces of colloidal particles having properties that they are not aggregated even if an organic solvent is added are coated with a trivalent and/or tetravalent metal is prepared by mixing an antimony pentaoxide sol with an aqueous solution of at least one basic salt of a trivalent metal and/or a tetravalent metal in a given mixing ratio.

In Japanese Patent Laid-Open Publication 180717/1990, the present applicant has disclosed that an antimony oxide sol containing fine particles and having a homogeneous particle diameter distribution is obtained by setting a molar ratio between antimony trioxide, an alkali substance and hydrogen peroxide to 1:2.0-2.5:0.8-1.5 and adding hydrogen peroxide to the system containing antimony trioxide and an alkali substance at a rate of 0.2 mol/hr based on 1 mol of the antimony trioxide in the preparation of an antimony sol by the reaction of antimony trioxide with an alkali substance and hydrogen peroxide.

The antimony oxide fine particles obtained by the conventional processes, however, are dispersed in a monodisperse state, and therefore, when they are used for a transparent film requiring antistatic properties, the resulting film shows insufficient antistatic properties depending upon the purpose, and adhesion of dirt or dust cannot be prevented in some cases. On this account, increasing the amount of the antimony oxide fine particles added or increasing the film thickness has been made, but in such a case, there is a problem of lowering of film strength and transparency or deterioration of economical efficiency.

It is also known that a hard coating film is formed on a surface of a substrate such as glass, plastic sheet or plastic lens in order to enhance scratch resistance of the substrate surface. To the hard coating film such an organic resin film or an inorganic, film, resin particles or inorganic particles such as silica are added to further enhance the scratch resistance.

Moreover, it is known that an anti-reflection film is formed on a surface of a substrate such as glass, plastic sheet or plastic lens to prevent reflection of the substrate surface. For example, it is known that a film of a low-refractive index material, such as a fluororesin or magnesium fluoride, is formed on a surface of a glass substrate or a plastic substrate by means of coating, deposition or CVD method, or an anti-reflection film is formed by coating a substrate surface with a coating liquid containing low-refractive index fine particles such as silica fine particles. For example, Japanese Patent Laid-open Publication No. 133105/1995 discloses that an anti-reflection substrate is prepared by the use of a sol wherein composite oxide colloidal particles consisting of silica and another inorganic oxide are dispersed. Further, formation of a conductive film containing metal fine particles or conductive oxide fine particles is carried out in order to impart antistatic properties and electromagnetic wave screening properties to the substrate.

Also when an anti-reflection film and/or a conductive film is provided as described above, a hard coating film is formed between the substrate and the anti-reflection film and/or the conductive film in order to enhance the scratch resistance.

In case of a conventional hard coating film, however, adhesion of the film to the substrate and scratch resistance of the film itself become insufficient especially when the substrate is a resin substrate.

Moreover, also when an anti-reflection film and/or a conductive film is provided on the conventional hard coating film, marring takes place after the hard coating film is formed or adhesion of dust due to static electricity takes place. Consequently, transparency or haze of the finally produced substrate with a conductive film is deteriorated, resulting in a problem of lowering of product yield.

In recent years, further, as portable telephones, PDA, notebook type personal computers and liquid crystal television sets, those of small and lightweight type have been used, and therefore, resin substrates have been used as the substrates. For example, acrylic resin substrate, polycarbonate substrate, triacetyl cellulose (TAC) resin substrate and the like have been used. In case of a conventional hard coating film, however, there is a large difference in the refractive index between the conventional hard coating film and these substrates, and interference fringe takes place when light is reflected, resulting in a problem of occurrence of display unevenness such as flickering, glaring and color shading. In addition, there is also a problem of insufficient adhesion of the film to these substrates.

In the light of the above problems, the present inventors have earnestly studied, and as a result, they have found that all of the above problems can be solved by using, instead of monodisperse particles, fine particle groups in each of which inorganic oxide fine particles having particle diameters of a specific range are connected in the form of a chain.

The present inventors have found that when the inorganic oxide fine particle groups are antimony oxide fine particle groups, the resulting transparent film exhibits excellent transparency and excellent antistatic properties, and even when they are other inorganic oxide fine particle groups, a film (hard coating film) having excellent adhesion to a substrate and excellent scratch resistance can be obtained by adding the inorganic oxide fine particle groups to the film, particularly to the hard coating film.

SUMMARY OF THE INVENTION

The present invention is as follows.

(1) A chain inorganic oxide fine particle group comprising inorganic oxide fine particles which have an average particle diameter of 4 to 200 nm, are connected in the form of a chain and have an average connection number of 2 to 30.

(2) The chain inorganic oxide fine particle group as stated in (1), comprising antimony oxide fine particles which have an average particle diameter of 5 to 50 nm and are connected in the form of a chain.

(3) The chain inorganic oxide fine particle group as stated in (2), wherein the chain fine particle group composed of antimony oxide has a volume resistance value of 5 to 2000 Ω·cm.

(4) The chain inorganic oxide fine particle group as stated in (1), wherein the inorganic oxide particles are silica particles or silica-alumina particles.

(5) The chain inorganic oxide fine particle group as stated in (4), wherein the silica particles or the silica-alumina particles are porous particles and/or hollow particles having a cavity inside.

(6) A process for preparing a chain antimony oxide fine particle group dispersion comprising:

treating an alkali antimonate aqueous solution with a cation exchange resin to prepare an antimonic acid (gel) dispersion, and then
treating the dispersion with an anion exchange resin and/or adding a base to the dispersion.

(7) The process for preparing a chain antimony oxide fine particle group dispersion as stated in (6), further comprising aging the resulting chain antimony oxide fine particle group dispersion at a temperature of 30 to 250° C.

(8) The process for preparing a chain antimony oxide fine particle group dispersion as stated in (6) or (7), wherein the antimonic acid (gel) dispersion has a solids concentration of 1 to 20% by weight, an electrical conductivity of 1 to 10 mS/cm and pH of 1 to 4.

(9) The process for preparing a chain antimony oxide fine particle group dispersion as stated in any one of (6) to (8), wherein the chain antimony oxide fine particle group dispersion has an electrical conductivity of 0.01 to 10 mS/cm and pH of 1 to 9.

(10) The process for preparing a chain antimony oxide fine particle group dispersion as stated in any one of (6) to (9), wherein the alkali antimonate aqueous solution is one obtained by allowing antimony trioxide to react with an alkali and hydrogen peroxide.

The substrate with a film according to the present invention is obtained by forming a film, which comprises the above-mentioned chain inorganic oxide fine particle group and a matrix component, singly or together with another film on a surface of a substrate, and is specifically as follows.

(11) A substrate with a film, comprising a substrate and a film formed on a surface of the substrate, said film comprising a chain inorganic oxide fine particle group comprising inorganic oxide fine particles which have an average particle diameter of 4 to 200 nm, are connected in the form of a chain and have an average connection number of 2 to 30, and a matrix component.

(12) The substrate with a film as stated in (11), wherein the chain inorganic oxide fine particle group comprises antimony oxide fine particles which have an average particle diameter of 5 to 50 nm and are connected in the form of a chain.

(13) The substrate with a film as stated in (12), wherein the chain antimony oxide fine particle group has a volume resistance value of 5 to 2000 Ω·cm.

(14) The substrate with a film as stated in (11), wherein the inorganic oxide fine particles are silica particles or silica-alumina particles.

(15) The substrate with a film as stated in (14), wherein the silica particles or the silica-alumina particles are porous particles and/or hollow particles having a cavity inside.

(16) The substrate with a film as stated in (14) or (15), wherein antimony pentaoxide ($Sb_2O_5$) particles having an average particle diameter of 2 to 100 nm are further contained.

(17) The substrate with a film as stated in (11), wherein the matrix component is a thermosetting resin or an ultraviolet curing resin.

(18) The substrate with a film as stated in (11), wherein a reaction product of polyol and an organosilicon compound is further contained as a film component, and the organosilicon compound is one or more compounds represented by the following formula (1) or (2):

$$R^1{}_m Si(OR^2)_{4-m} \text{ or } R^1{}_m Si(HA.)_{4-m} \tag{1}$$

wherein $R^1$ and $R^2$ are selected from an alkyl group, an aryl group, a vinyl group, an acrylic group, a methacrylic group, an epoxy group, a halogenated alkyl group, an alkyl group containing an amino or mercapto group or a hydrogen atom, and m is 0, 1, 2 or 3, HA is halogen atom,

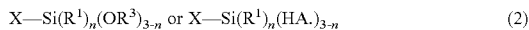  (2)

wherein $R^3$ is selected from an alkyl group, an aryl group, a vinyl group, an acrylic group, a methacrylic group or an epoxy group, n is 0, 1, or 2, HA is halogen atom, and X is —Y—Si($R^1$)$_n$(O$R^3$)$_{3-n}$, —Y—Si($R^1$)$_n$(HA.)$_{3-n}$ or —Y—H, Y is —(CH$_2$)$_p$—(CF$_2$)$_q$—(CH$_2$)$_p$— wherein p and q are each an integer of 0 to 6, HA is halogen atom.

(19) The substrate stated in (18), wherein the polyol is at least one polyol selected from polyether polyol, acrylic polyol and urethane polyol.

(20) The substrate as stated in (18) or (19), wherein the polyol has a functional group represented by the following formula (3):

  (3)

wherein $R^5$ and $R^7$ are each an alkyl group or hydrogen, and r is 1, 2 or 3.

DETAILED DESCRIPTION OF THE INVENTION

Chain Inorganic Oxide Fine Particle Group

The chain inorganic oxide fine particle group of the invention comprises inorganic oxide fine particles (primary particles) which have an average particle diameter of 4 to 200 nm, are connected in the form of a chain and have an average connection number (i.e., average number of the connected fine particles) of 2 to 30.

Although the inorganic oxide is not specifically restricted, antimony oxide, silica, alumina or silica-alumina is preferable from the viewpoint of ease of forming the chain fine particle group. Next, a chain antimony oxide fine particle group and a silica-alumina type inorganic oxide fine particle group are described in detail.

Chain Antimony Oxide Fine Particle Group

The chain antimony oxide fine particle group is used for forming a film for the purpose of imparting anti-reflection properties, antistatic properties or hardness properties.

The antimony oxide fine particles to constitute the fine particle group have an average primary particle diameters of 5 to 50 nm, preferably 10 to 40 nm. The antimony oxide may be antimony trioxide or antimony pentaoxide. The antimony pentaoxide usually has electrical conductivity. The antimony oxide may be one doped with indium oxide, tin oxide or the like.

If the average particle diameter of the antimony oxide fine particles is less than 5 nm, the antimony oxide fine particles are liable to be aggregated, and it becomes difficult to obtain chain antimony oxide fine particles. If the average particle diameter of the antimony oxide fine particles exceeds 50 nm, it becomes difficult to obtain long-chain antimony oxide fine particles, and even if they are obtained, lowering of transparency or deterioration of haze sometimes takes place when they are used for a substrate with a transparent film.

The chain antimony oxide fine particles for use in the invention are those in which 2 to 30, preferably 5 to 30, on the average, of the above-mentioned antimony oxide fine particles are connected in the form of a chain.

When the average particle diameter and the average connection number are in the above ranges, monodisperse particles do not substantially exist, and boundary resistance is low. Therefore, chain antimony oxide fine particles having high electrical conductivity are obtained.

If the average connection number of the antimony oxide fine particles is less than 2, the antimony oxide fine particles are substantially the same as monodisperse particles, and the later-described volume resistance value becomes large. Therefore, if such fine particles are used in a transparent film, a sufficient antistatic effect is not obtained in some cases.

If the average connection number of the antimony oxide fine particles exceeds 30, it is difficult to obtain a chain fine particle group, and such fine particles are liable to form an aggregate without forming a chain fine particle group. Even if a chain fine particle group is obtained, the group is too long and is tangled with other groups. Therefore, the effect of lowering volume resistance value is sometimes decreased.

The connection number of the antimony oxide fine particles is determined in the following manner. A scanning electron microscope photograph of fine particle groups is taken. Then, in the region where about 100 chain fine particle groups are present, the antimony oxide fine particles connected in the form of a chain are counted, and an average is calculated.

The average particle diameter of primary particles of the antimony oxide fine particles to constitute the chain fine particle group is determined in the following manner. In each of the above-mentioned about 100 chain fine particle groups, an average of a maximum particle diameter and a minimum particle diameter of the antimony oxide fine particles to constitute the chain fine particle group is calculated, and an average of each 100 chain particle groups is taken as an average particle diameter.

The chain antimony oxide fine particle group desirably has a volume resistance value, as defined below, of 5 to 2000 Ω·cm, preferably 10 to 1000 Ω·cm. When the volume resistance value is in this range, a film having excellent electrical conductivity and excellent antistatic properties can be formed.

In the present invention, the volume resistance value is determined in the following manner. A ceramic cell having a cylindrical hole (sectional area: 0.5 cm$^2$) inside is placed on a base electrode, and the cell is filled with 0.6 g of a sample powder. Then, a protrusion of an upper electrode with a cylindrical protrusion is inserted, then a pressure is applied to the upper and the lower electrodes by a hydraulic press, and under application of a pressure of 100 kg/cm$^2$ (9.80 MPa), a resistance value (Ω) and a height (cm) of the sample are measured. The resistance value is multiplied with the height to obtain a volume resistance value.

In the chain antimony oxide fine particles, a doping agent such as tin or phosphorus may be contained. When the doping agent is contained in the fine particles, the volume resistance value of the chain antimony oxide fine particles is further decreased.

The chain antimony oxide fine particles may be used after dried, but by the reason of the preparation, they are obtained in the form of a dispersion containing them. In the state of a dispersion, the fine particles exist stably, and transportation or other operations can be carried out conveniently. Therefore, it is desirable to use the chain antimony oxide fine particles as a chain antimony oxide fine particle group dispersion.

The dispersion of chain antimony oxide fine particles is a dispersion wherein the aforesaid chain antimony oxide fine particles are dispersed in water. The dispersion desirably has a solids concentration (in terms of antimony oxide) of usually 1 to 50% by weight, preferably 2 to 40% by weight.

The chain antimony oxide fine particle group dispersion desirably has pH of 1 to 9, preferably 2 to 8.

If pH of the chain antimony oxide fine particle group dispersion is less than 1, the length of the chain fine particle group tends to be shortened, and the effect of improving electrical conductivity of the chain antimony oxide fine particles tends to become insufficient. If pH of the chain antimony oxide fine particle group dispersion exceeds 9, dispersibility and stability are lowered, and the use application or the use method is sometimes restricted.

In the chain antimony oxide fine particle group dispersion, alcohols, such as methanol, ethanol, propanol, butanol, diacetone alcohol, furfuryl alcohol, tetrahydrofurfuryl alcohol, ethylene glycol and hexylene glycol, esters, such as methyl acetate and ethyl acetate, ethers, such as diethyl ether, ethylene glycol monomethyl ether, ethylene glycol monoethyl ether, ethylene glycol monobutyl ether, diethylene glycol monomethyl ether and diethylene glycol monoethyl ether, and ketones, such as acetone, methyl ethyl ketone, acetyl acetone and acetoacetic acid ester, can be used singly or in combination of two or more kinds when needed, in addition to water.

The chain antimony oxide fine particle group dispersion desirably has an electrical conductivity of 0.01 to 10 mS/cm, preferably 0.05 to 5 mS/cm. It is difficult to obtain a chain antimony oxide fine particle group dispersion having an electrical conductivity of less than 0.01 mS/cm, and even if such a dispersion is obtained, the productivity tends to be greatly decreased. If the electrical conductivity of the chain antimony oxide fine particle group dispersion exceeds 10 mS/cm, the content of the chain antimony oxide fine particles is decreased, that is, it tends to become difficult to form a chain fine particle group.

There is no specific limitation on the process for preparing the chain antimony oxide fine particles of the invention and the process for preparing a dispersion of the fine particles, provided that those satisfying the aforesaid requirements are obtained. However, the following process is preferable because a dispersion of chain antimony oxide fine particles, in which monodisperse particles do not substantially exist, the antimony oxide fine particles are sufficiently connected with each other and the volume resistance value is low because of low boundary resistance, can be obtained.

Process for Preparing Chain Antimony Oxide Fine Particle Group Dispersion

The process for preparing a chain antimony oxide fine particle group dispersion according to the invention is described below.

The process for preparing a chain antimony oxide fine particle group dispersion according to the invention comprises treating an alkali antimonate aqueous solution with a cation exchange resin to prepare an antimonic acid (gel) dispersion and then treating the dispersion with an anion exchange resin and/or adding a base to the dispersion.

The alkali antimonate aqueous solution for use in the invention is preferably an alkali antimonate aqueous solution used in the process for preparing an antimony oxide sol disclosed in Japanese Patent Laid-Open Publication No. 180717/1990 applied by the present applicant.

More specifically, an alkali antimonate aqueous solution obtained by allowing antimony trioxide to react with an alkali substance and hydrogen peroxide is preferable. For obtaining the alkali antimonate aqueous solution, antimony trioxide, the alkali substance and hydrogen peroxide are used in a molar ratio of 1:2.0-2.5:0.8-1.5, preferably 1:2.1-2.3:0.9-1.2, and to the system containing the antimony trioxide and the alkali substance, hydrogen peroxide is added at a rate of not more than 0.2 mol/hr based on 1 mol of the antimony trioxide.

The antimony trioxide used herein is preferably in the form of a powder, particularly a fine powder having an average particle diameter of not more than 10 μm. Examples of the alkali substances include lithium, potassium, sodium, magnesium and calcium. Of these, preferable are alkali metal hydroxides, such as KOH and NaOH. These alkali substances contribute to stabilizing the resulting antimonic acid solution.

First, given amounts of an alkali substance and antimony trioxide are added to water to prepare an antimony trioxide suspension. The antimony trioxide concentration of this antimony trioxide suspension is desired to be in the range of 3 to 15% by weight. Then, the suspension is heated to a temperature of not lower than 50° C., preferably not lower than 80° C. To the suspension, hydrogen peroxide water having a concentration of 5 to 35% by weight is added at a rate of not more than 0.2 mol/hr (in terms of hydrogen peroxide) based on 1 mol of the antimony trioxide.

If the addition rate of hydrogen peroxide is high, particle diameters of the antimony oxide fine particles (primary particles) in the resulting chain antimony oxide fine particle group dispersion become large, and the particle diameter distribution is sometimes widened. If the addition rate of hydrogen peroxide is very slow, the productivity is not increased. Therefore, the addition rate of hydrogen peroxide is in the range of 0.04 to 0.2 mol/hr, preferably 0.1 to 0.15 mol/hr.

As the molar ratio of hydrogen peroxide to the antimony trioxide is decreased, particle diameters of primary particles of the resulting chain antimony oxide fine particles tend to become smaller, but if the molar ratio is less than 0.8, the amount of the undissolved antimony trioxide is increased. If the molar ratio is larger than 1.5, particle diameters of the primary particles sometimes become large. Accordingly, when the molar ratio is in the above range, antimony trioxide is dissolved and particle diameters of the primary particles do not become too excessively large.

From the alkali antimonate aqueous solution obtained by the above reaction, the undissolved residue is separated if necessary, then the solution is diluted to control its concentration if necessary, and the solution is treated with a cation exchange resin to remove alkali ion, whereby an antimoic acid (gel) dispersion is prepared.

In the alkali antimonate aqueous solution, an aqueous solution containing a doping agent, such as an alkali stannate aqueous solution or a sodium phosphate aqueous solution, may be contained. When the doping agent is contained, the antimony oxide is doped with tin or phosphorus, and thereby chain antimony oxide fine particles having a lower volume resistance value can be obtained.

The antimonic acid (gel) contains aggregates of fine hydrated antimony oxide particles having particle diameters of about 1 to 5 nm and is in a state of a gel.

In the treatment with the cation exchange resin, the alkali antimonate aqueous solution desirably has a solids concentration of 0.01 to 5% by weight, preferably 0.1 to 3% by weight.

The treatment with the cation exchange resin is carried out by, for example, passing the alkali antimonate aqueous solution through a column filled with an ion exchange resin or by adding an ion exchange resin to the aqueous solution, mixing them and separating only the ion exchange resin.

If the solids concentration of the alkali antimonate aqueous solution is less than 0.01% by weight, the production efficiency is low. If the solids concentration thereof exceeds 5% by weight, a large antimonic acid gel is formed, and it becomes difficult to obtain the aforesaid chain antimony oxide of the invention.

It is preferable to use the cation exchange resin in such an amount that the electrical conductivity and the pH should be in the following ranges.

The resulting antimonic acid (gel) dispersion desirably has an electrical conductivity of 1 to 10 mS/cm, preferably 2 to 5 mS/cm, and pH of 1 to 4, preferably 1 to 3.

If the electrical conductivity of the antimonic acid (gel) dispersion is less than 1 mS/cm, strongly aggregated particles are formed, and it sometimes becomes difficult to obtain a chain fine particle group even if the dispersion is treated with an anion exchange resin. If the electrical conductivity of the antimonic acid (gel) dispersion exceeds 10 mS/cm, monodisperse particles tend to be formed.

If pH of the antimonic acid (gel) dispersion is less than 1, aggregated particles tend to be formed without forming a chain fine particle group. If pH of the antimonic acid (gel) dispersion exceeds 4, monodisperse particles tend to be formed.

Then, the antimonic acid (gel) dispersion is treated with an anion exchange resin, or a base is added to the antimonic acid (gel) dispersion. By the treatment with an anion exchange resin or by the addition of a base, chain antimony oxide fine particles of the invention are formed. In the present invention, both of the treatment with an anion exchange resin and the addition of a base may be carried out.

The treatment with an anion exchange resin is carried out by, for example, passing the antimonic acid (gel) dispersion through a column filled with an ion exchange resin or by adding an ion exchange resin to the dispersion, mixing them and separating only the ion exchange resin.

In the treatment with the anion exchange resin, the electrical conductivity of the dispersion is in the range of 0.01 to 10 mS/cm, preferably 0.05 to 5 mS/cm, and pH of the dispersion is in the range of 1 to 9, preferably 2 to 8.

In case of the addition of a base, it is desirable to add a base, such as $NH_3$, NaOH, KOH, tetramethylammonium hydroxide (TMAH), in such an amount that the electrical conductivity of the dispersion should be in the range of 0.01 to 10 mS/cm, preferably 0.05 to 5 mS/cm, and that the pH thereof should be in the range of 1 to 9, preferably 2 to 8.

If the electrical conductivity and the pH are out of the above ranges, it becomes difficult to obtain a chain antimony oxide fine particle group, and even if it is obtained, the yield is sometimes lowered.

Although the reason why the chain fine particle group is formed by the treatment of the antimonic acid (gel) dispersion with an anion exchange resin or the addition of a base to the dispersion is not clear, it is thought that the electrostatic charge on the surfaces of the antimony oxide particles (primary particles) is decreased, and the particles are connected in the form of a chain without being strongly aggregated.

When the electrical conductivity and the pH of the chain antimony oxide fine particle group dispersion are in the above ranges, stability of the chain antimony oxide fine particle group dispersion is high and the chain fine particle group is not broken. Further, the chain fine particle groups are not aggregated, so that any aggregate of the groups is not formed.

In the present invention, the chain antimony oxide fine particle group dispersion is then desirably subjected to aging at a temperature of 30 to 250° C., preferably 50 to 200° C., when needed.

If the temperature in the aging of the chain antimony oxide fine particle group dispersion is lower than 30° C., monodisperse antimony oxide fine particles sometimes remain. Moreover, connection of the antimony oxide fine particles to constitute the chain fine particle group is insufficient, and hence the chain fine particle group is easily broken, or enhancement of crystallizability of the antimony oxide is insufficient, and hence a dispersion of chain antimony oxide fine particles having a low volume resistance value cannot be obtained in some cases.

Even if the temperature in the aging exceeds 250° C., connection of the antimony oxide fine particles is not further accelerated, and crystallizability of the antimony oxide fine particles is not enhanced either.

The chain antimony oxide fine particle group dispersion obtained as above desirably has an electrical conductivity of 0.01 to 10 mS/cm, preferably 0.05 to 5 mS/cm, and pH of 1 to 9, preferably 2 to 8.

When the electrical conductivity and the pH of the chain antimony oxide fine particle group dispersion are in the above ranges, stability of the chain antimony oxide fine particle group dispersion is high and the chain fine particle group is not broken. Further, the chain fine particle groups are not aggregated, so that any aggregate of the groups is not formed.

Such a change of pH as mentioned above is considered as follows. When the antimonic acid gel is treated with an ion exchange resin, the ion concentration is lowered to thereby lower electrical conductivity, and together with the lowering of electrical conductivity, a rise of pH takes place. Even if aging is carried out, electrical conductivity and pH are not substantially changed, or electrical conductivity is lowered.

In the chain antimony oxide fine particle group dispersion obtained, 2 to 30, preferably 5 to 30, on the average, of antimony oxide fine particles (primary particles) having an average particle diameter of 5 to 50 nm are connected in the form of a chain to form chain antimony oxide fine particles.

The chain antimony oxide fine particle group dispersion obtained as above is then concentrated by an ultrafilter method or the like or diluted with water, when needed, to obtain a dispersion having a desired concentration, usually a solids concentration (in terms of antimony oxide) of 5 to 40% by weight.

By replacing water with an organic solvent, an organic solvent dispersion of the chain antimony oxide fine particles can be obtained. As the organic solvent, the same organic solvent as previously described is employable.

Silica-Alumina Type Inorganic Oxide Particle Group

The silica-alumina type inorganic oxide particle group is usually used for forming a hard coating film.

The inorganic oxide particles to constitute the inorganic oxide particle group used for forming the hard coating film desirably have an average particle diameter (i.e., primary particle diameter) of 4 to 200 nm, preferably 5 to 100 nm. It is difficult to obtain inorganic oxide particles having a small average particle diameter. If the average particle diameter is too large, it becomes difficult to obtain a chain inorganic oxide particle group, and even if it is obtained, haze of the hard coating film tends to be deteriorated.

In the inorganic oxide particle group, 2 to 30, preferably 5 to 30, on the average, of such inorganic oxide particles as mentioned above are connected in the form of a chain. If the average connection number of the inorganic oxide particles is less than 2, the inorganic oxide particles are substantially the same as monodisperse particles, and it is difficult to obtain a hard coating film having excellent adhesion to a substrate, scratch resistance, scratch strength and pencil hardness.

It is difficult to obtain a chain fine particle group having an average connection number of inorganic oxide particles of more than 30, and even if such a chain fine particle group is obtained, aggregates of the groups are formed, and hence the particles are dispersed heterogeneously in the resulting hard coating film. Moreover, haze of the hard coating film is sometimes deteriorated.

As the inorganic oxide to constitute the particle group, fine particles of silica, alumina, zirconia, silica-alumina or the like are employable. Of these, silica particles or silica-alumina particles (both of them are sometimes referred to as "silica type particles") are preferable. When these particles are used, a hard coating film having high film strength and excellent transparency can be formed.

The silica type particles are preferably porous particles and/or hollow particles having a cavity inside. When such particles are used, a film having excellent scratch resistance and having more excellent adhesion, scratch strength and pencil hardness can be formed. These particles have low refractive index. Therefore, even when high-refractive index particles are used according to necessity, the refractive index of the resulting hard coating-film can be lowered, and consequently, a difference in the refractive index between the hard coating film and the substrate can be decreased. On this account, occurrence of interference fringe can be inhibited. Accordingly, the hard coating film of the invention can be favorably used even if the refractive index of the substrate is not more than 1.55.

As the silica type particles, those described in, for example, Japanese Patent Laid-Open Publication No. 79616/2002 applied by the present applicant are employable.

The porous particles or the hollow particles are particles having a shell layer and having pores inside or a cavity inside. The thickness of the shell layer is desirably in the range of 1 to 20 nm, preferably 2 to 15 nm. When the thickness of the shell layer is in this range, an effect of a low refractive index is sufficiently obtained. The porous particles and the hollow particles desirably have a porosity of not less than 10% by volume.

The inorganic oxide particles for use in the invention desirably have a refractive index of less than 1.41. In case of the silica type porous particles, the refractive index is preferably in the range of 1.41 to, 1.37, and in case of the silica type hollow particles, the refractive index is preferably less than 1.37. The inorganic oxide particles having a refractive index of this range particularly exhibit a high effect of a low refractive index and can form a hard coating film having excellent transparency and anti-reflection properties.

The process for preparing the silica type chain fine particle group is not specifically restricted, provided that the above-mentioned inorganic oxide particle group is obtained, and the inorganic oxide particle group can be prepared by a hitherto known process. For example, the inorganic oxide particle group can be obtained by controlling concentration or pH of a monodisperse silica particle dispersion and subjecting the dispersion to hydrothermal treatment at a high temperature of, for example, not lower than 100° C. In this process, a binder component may be added to promote connection of the particles, if desired. The silica type particle dispersion used may be passed through an ion exchange resin to remove ion. By the ion exchange treatment, formation of chain particles is promoted. After the hydrothermal treatment, an ion exchange treatment may be carried out again.

Short fibrous silica or the like disclosed in Japanese Patent Laid-Open Publication No. 61043/1999 applied by the present applicant is also preferably employed for preparing the inorganic oxide particle group (silica particle group) of the invention.

In detail, to a water dispersion of silica particles, ammonia is added if necessary so as to adjust the ammonia concentration of the dispersion to 50 to 400 ppm, preferably 50 to 200 ppm, more preferably 50 to 100 ppm. By virtue of this treatment, silica particles form a chain fine particle group. The water dispersion may be subjected to hydrothermal treatment at a temperature of not lower than 250° C., preferably not lower than 270° C. By virtue of this hydrothermal treatment, the silica particles grow two-dimensionally and are connected to form a short fibrous inorganic oxide particle group.

The resulting inorganic oxide particle groups can be used after classification, when needed.

Substrate with Film

In the substrate with a film according to the invention, a film comprising the above-described chain inorganic oxide fine particle groups and a matrix component is formed singly or together with another film on a surface of a substrate for the purpose of imparting anti-reflection properties, antistatic properties or hardness properties. Especially in case of the chain antimony oxide fine particle groups, they are often used for forming a hard coating film, a transparent film or an antistatic film, and in case of the silica-alumina type chain inorganic oxide fine particle groups, they are often used for forming a hard coating film.

Examples of the substrates employable herein include glasses; sheets, films, lenses and panels made of plastics such as polycarbonate, acrylic resin, PET and TAC; polarizing films, cathode ray tubes, fluorescent character display tubes, liquid crystal displays, projection displays, plasma displays and EL displays.

Although the film containing the chain inorganic oxide fine particle groups may be formed singly on the substrate, it may be formed in combination with other films, such as a protective film, a planarization film, a high-refractive index film, an insulating film, a conductive resin film, a conductive metal fine particle film, a conductive metal oxide fine particle film and a primer film optionally used, according to the purpose. When the film of the invention is used in combination, it does not necessarily have to be formed on the outermost side.

A film-forming coating liquid used for producing the substrate with a film of the invention is a mixture of the aforesaid chain inorganic oxide fine particle group dispersion and a film-forming matrix. To the mixture, an organic solvent may be added when needed.

The chain inorganic oxide fine particle groups may be treated with a coupling agent, when needed.

The film-forming matrix means a component capable of forming a film on a surface of the substrate, and can be selected from resins satisfying the requirements such as adhesion to the substrate, hardness and coating properties.

As the matrix, any of thermosetting resins and thermoplastic resins known as resins for coating materials is employable. More specifically, there can be mentioned thermoplastic resins, such as polyester resin, acrylic resin, urethane resin, vinyl chloride resin, fluororesin, vinyl acetate resin and silicone rubber, and thermosetting resins, such as urethane resin, melamine resin, silicon resin, butyral resin, reactive silicone resin, phenolic resin, epoxy resin, unsaturated polyester resin and thermosetting acrylic resin. These resins may be emulsion resins, water-soluble resins or hydrophilic resins. In case of the thermosetting resins, they may be resins of ultraviolet curing type or electron ray curing type. In the thermosetting resins, curing catalysts may be contained. Mixtures of these resins, and resins for coating materials, such as copolymers of these resins and modified products thereof, are also employable.

In the present invention, it is also possible to use hydrolyzable organic silicon compounds, such as alkoxysilane, and partial hydrolizates thereof.

Together with the above matrix, a reaction product of polyol and an organosilicon compound may be contained as a matrix component. As the organosilicon compound, one or more compounds represented by the following formula (1) or (2) are employable.

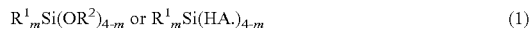

$$R^1{}_m Si(OR^2)_{4-m} \text{ or } R^1{}_m Si(HA.)_{4-m} \qquad (1)$$

wherein $R^1$ and $R^2$ are selected from an alkyl group, an aryl group, a vinyl group, an acrylic group, a methacrylic group, an epoxy group, a halogenated alkyl group, an alkyl group containing an amino or mercapto group or a hydrogen atom, and m is Of 1, 2 or 3, $$X—Si(R^1)_n(OR^3)_{3-n} \text{ or } X—Si(^1)_n(HA.)_{3-n} \qquad (2)$$

wherein $R^3$ is selected from an alkyl group, an aryl group, a vinyl group, an acrylic group, a methacrylic group or an epoxy group, n is 0, 1, or 2, HA is halogen atom, and X is —Y—Si($R^1$)$_n$(O$R^3$)$_{3-n-3}$, —Y—Si ($R^1$)$_n$(HA.)$_{3-n}$ or —Y—H, Y is —(CH$_2$)$_p$—(CF$_2$)$_q$—(CH$_2$)$_p$— wherein p and q are each an integer of 0 to 6, HA is halogen atom.

Polyol

Examples of the polyols employable in the invention include polyether polyol, acrylic polyol and urethane polyol.

The polyol for use in the invention desirably has a hydroxyl value X of 1 to 500 mgKOH/g, preferably 10 to 300 mgKOH/g, and a total unsaturation degree Y of not more than 0.07 meq/g.

If the hydroxyl value X of the polyol is less than 1 mgKOH/g, reactivity of the polyol to the later-described organosilicon compound is low, and a transparent film formed by the use of a transparent film-forming coating liquid containing a reaction product of the polyol and the organosilicon compound exhibits an insufficient effect of improving adhesion to the substrate and cannot have sufficient scratch resistance in some cases.

If the hydroxyl value X of the polyol exceeds 500 mgKOH/g, many unreacted hydroxyl groups remain, and film shrinkage is increased in the formation of a transparent film, sometimes resulting in occurrence of cracks.

If the total unsaturation degree Y of the polyol exceeds 0.07 meq/g, film shrinkage is increased in the formation of a transparent film, sometimes resulting in curving of the film or occurrence of cracks.

The polyol for use in the invention desirably has a molecular weight of 1,000 to 100,000, preferably 2,000 to 50,000, in terms of polystyrene.

As the polyol, commercially available polyol can be used without any restriction.

If the molecular weight of the polyol is less than 1,000, molecules of the resulting reaction product of the polyol and the organosilicon compound have short molecular length, have no direction property (orientation property) and become random. Therefore, bond properties (affinity, interaction) of the resulting film to the substrate become insufficient, and satisfactory adhesion properties are not obtained in some cases.

If the molecular weight of the polyol exceeds 100,000, reaction products of the polyol and the organosilicon compound are hardly bonded with one another, and scratch resistance of the resulting film tends to be lowered.

The polyol for use in the invention preferably has a functional group represented by the following formula (3):

$$—Si(R^5)_{3-r}(OR^7)_r \qquad (3)$$

wherein $R^5$ and $R^7$ are an alkyl group or hydrogen, and r is 1, 2 or 3.

Examples of such functional groups include dimethylmethoxysilyl, methyldimethoxysilyl, trimethoxysilyl, diethylethoxysilyl, ethyldiethoxysilyl and triethoxysilyl.

When the polyol has such a functional group, the alkoxy group of the polyol is hydrolyzed and reacts with the organosilicon compound. Therefore, the resulting reaction product exhibits high affinity for the matrix-forming component, and a transparent film obtained by the use of the reaction product has excellent adhesion to the substrate.

The polyol having a functional group represented by the formula (3) is on the market under the name of Excestar (available from Asahi Glass Co., Ltd.) or Zemrac (available from Kaneka Co., Ltd.).

Organosilicon Compound

Examples of the organosilicon compounds represented by the formula (1) include tetramethoxysilane, tetraethoxysilane, tetrapropoxysilane, tetrabutoxysilane, methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, isobutyltrimethoxysilane, vinyltrimethoxysilane, vinyltriethoxysilane, vinyltris(β-methoxyethoxy)silane, 3,3,3-trifluoropropyltrimethoxysilane, methyl-3,3,3-trifluoropropyldimethoxysilane, β-(3,4-epoxycyclohexyl)ethyltrimethoxysilane,
γ-glycidoxytripropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltriinethoxysilane, γ-methacryloxypropylmethyldiethoxysilane, γ-methacryloxypropyltriethoxylsilane, N-β(aminoethyl)γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane, N-phenyl-γ-aminopropyltrimethoxysilane,
γ-mercaptopropyltrimethoxysilane, trimethylsilanol, methyltrichlorosilane, methyldichlorosilane, dimethyldichlorosilane, trimethylchlorosilane, phenyltrichlorosilane, diphenyldichlorosilane, vinyltrichlorosilane, trimethylbromosilane and diethylsilane.

Of these, tetramethoxysilane, tetraethoxysilane, tetrapropoxysilane and tetrabutoxysilane are preferably used because they have high reactivity to polyol, and a transparent film obtained by the use of a reaction product of such tetraalkoxysilane and polyol exhibits excellent adhesion to the substrate and excellent scratch resistance.

Further, γ-glycidoxypropylmethyldiethoxysilane, γ-methacryloxypropyltrimethoxysilane and the like are also preferably used for a transparent film-forming coating liquid of acrylic resin type because a reaction product of such a compound and polyol has high reactivity to a matrix-forming component of acrylic resin type to thereby improve scratch resistance.

Examples of the organosilicon compounds represented by the formula (2) include heptadecafluorodecylmethyldimethoxysilane, heptadecafluorodecyltrichlorosilane, heptadecafluorodecylmethyltrimethoxysilane, trifluoropropyltrimethoxysilane, tridecafluorooctyltrimethoxysilane, Heptadecafluorodecyl-di-methyldimethoxysilane, heptadecafluorodecyl-di-trichlorosilane, heptadecafluorodecylmethyl-di-trimethoxysilane, trifluoropropyl-di-t-rimethoxysilane, tridecafluorooctyl-di-trimethoxysilane and $(CH_3O)_3SiC_2H_4C_6F_{12}C_2H_4Si(CH_3O)_3$.

The reaction product of polyol and the organosilicon compound is a compound obtained by dehydration polycondensation reaction of the above-mentioned polyol with the organosilicon compound.

Such a reaction product, e.g., a compound obtained by a process comprising dissolving tetraalkoxysilane and polyol in a water/alcohol mixed solvent, adding an acid such as nitric acid, and if necessary performing solvent replacement with an alcohol by an evaporator or the like, can be favorably used for a transparent film-forming coating liquid.

When such a reaction product is contained in the coating liquid, a transparent film having excellent adhesion to the substrate or another film and showing excellent scratch resistance, scratch strength, pencil hardness, flexibility, antireflection properties and antistatic properties can be formed.

When the reaction product is contained in the film, the content of the reaction product in the matrix is desirably in the range of 1 to 50% by weight, preferably 2 to 30% by weight, in terms of solids. If the content of the reaction product is too low, an effect of enhancing adhesion to the substrate or another film optionally provided is not obtained sufficiently, and besides an effect of enhancing scratch resistance, scratch strength and flexibility is not obtained sufficiently in some cases. If the content of the reaction product is too high, adhesion or flexibility is sometimes lowered.

Preparation of Coating Liquid

When a resin for coating material is used as a matrix, the coating liquid can be prepared by, for example, the following process. An organic solvent dispersion obtained by replacing water (dispersion medium) of the aforesaid inorganic oxide fine particle group dispersion with an organic solvent, such as an alcohol, or an organic solvent dispersion obtained by treating the chain inorganic oxide fine particle groups with a known coupling agent if desired and then dispersing them in an organic solvent, and a resin for coating material are diluted with an appropriate organic solvent.

On the other hand, when a hydrolyzable organosilicon compound is used as a matrix, the coating liquid can be prepared by, for example, the following process. Water and an acid or an alkali as a catalyst are added to a mixture of alkoxysilane and an alcohol to obtain a partial hydrolyzate of alkoxysilane, then the hydrolyzate is mixed with a chain inorganic oxide fine particle group dispersion, and then if necessary, the mixture is diluted with an organic solvent.

The weight ratio of the chain inorganic oxide particle group to the matrix in the film-forming coating liquid is preferably in the range of 1/99 to 9/1 (chain inorganic oxide particle group/matrix). If the weight ratio exceeds 9/1, strength of the film and adhesion of the film to the substrate are lowered to reduce practical usefulness. If the weight ratio is less than 1/99, the effect of enhancing antistatic properties of the film, adhesion of the film to the substrate and film strength due to the addition of the chain inorganic oxide particle groups becomes insufficient. The above-mentioned weight ratio becomes a weight ratio in the resulting film without change.

The film-forming coating liquid is applied onto the substrate by a known method such as dipping, spraying, spinner method or roll coating, then dried, and if necessary, cured by heating or irradiation with ultraviolet light, to form a film.

The thickness of the film is not specifically restricted and is appropriately selected according to the purpose.

Substrate with Hard Coating Film

Next, a substrate with a hard coating film, wherein a hard coating film using the aforesaid silica-alumina type chain inorganic oxide fine particle group as the chain inorganic oxide fine particle group is formed, is described.

Examples of the substrates include the aforesaid ones, specifically, glasses, and plastic sheets, plastic films and plastic panels made of plastics such as polycarbonate, acrylic resin, PET and TAC. Of these, resin substrates are preferably employed.

Hard Coating Film

The hard coating film comprises a matrix component and the aforesaid silica-alumina type chain inorganic oxide fine particle groups.

The content of the inorganic oxide fine particle groups in the hard coating film is desired to be in the range of 5 to 90% by weight, preferably 10 to 80% by weight. If the content of the inorganic oxide fine particle groups in the hard coating film is low, the hard coating film does not have excellent adhesion to the substrate, scratch resistance, scratch strength and pencil hardness in some cases. If the content of the inorganic oxide fine particle groups in the hard coating film is high, the hard coating film does not have excellent adhesion to the substrate, scratch resistance, scratch strength and pencil hardness because the amount of the matrix component is small.

Even if the chain antimony oxide fine particle groups are used instead of the silica-alumina type inorganic oxide fine particle groups, it is possible to form a hard coating film having the same properties as mentioned above. In this case, the content of the chain antimony oxide fine particle groups in the hard coating film is almost the same as that of the chain inorganic oxide fine particle groups.

It is preferable that the hard coating film of the invention further contains antimony pentaoxide ($Sb_2O_5$) particles having an average particle diameter of 2 to 100 nm, preferably 5 to 80 nm. Since the antimony pentaoxide particles have moderate electrical conductivity, they can impart antistatic properties, and besides, they have a function of resin curing acceleration when a resin is used as a matrix. The antimony pentaoxide particles may be in the form of the aforesaid chain fine particle group.

When the antimony pentaoxide particles are contained in the hard coating film as in the present invention, the hard coating film has excellent adhesion to the substrate and shows excellent scratch resistance and film hardness. Such effects are peculiar to the antimony pentaoxide particles among the conductive oxide particles, and other conductive oxide particles, such as indium oxide, tin-doped indium oxide and low titanium oxide, antimony trioxide particles and metal fine particles do not exhibit such effects.

Although the reason is not clear, it is thought that when the matrix component is a thermosetting resin or an ultraviolet curing resin, the antimony pentaoxide particles accelerates curing of such a resin.

In case of other particles than the antimony pentaoxide particles, the resin for coating material is slowly cured or not cured occasionally. It is thought that there is any other cause of hindrance of curing in case of other particles but the antimony pentaoxide particles contributes to suppression of the hindrance.

If the average particle diameter of the antimony pentaoxide particles is less than the lower limit of the above range, an effect of enhancing adhesion to the substrate, scratch resistance and film hardness is not obtained, or depending upon circumstances, lowering of these properties takes place. Moreover, powder resistance is increased, and hence, sufficient antistatic properties are not obtained occasionally.

If the average particle diameter of the antimony pentaoxide particles exceeds the upper limit of the above range, lowering of transparency of the film, coloring of the film or increase of haze sometimes takes place, though it depends upon the content of the antimony pentaoxide particles.

The content of the antimony pentaoxide particles in the hard coating film is desired to be in the range of 5 to 80% by weight, preferably 10 to 60% by weight, in terms of $Sb_2O_5$, though it varies depending upon the content of the inorganic oxide particle groups.

If the content (in terms of $Sb_2O_5$) of the antimony pentaoxide particles in the hard coating film is less than the lower limit of the above range, sufficient antistatic properties do not appear, and hence, adhesion of dust is liable to take place on the resulting substrate with a hard coating film. On this account, in the production of a substrate having the later-described anti-reflection film and/or intermediate film (conductive film, refractive index-controlling film), the resulting substrate sometimes has poor transparency and haze, and the product yield is lowered. Further, when a thin hard coating film having a film thickness of not more than about 10 μm, particularly not more than 5 μm, more particularly not more than 2 μm, is formed, the effect of curing the resin for coating material or the effect of promoting curing sometimes becomes insufficient, and hence, an effect of enhancing adhesion to the substrate, scratch resistance and film hardness is not sufficiently obtained in some cases.

If the content (in terms of $Sb_2O_5$) of the antimony pentaoxide particles in the hard coating film exceeds the upper limit of the above range, lowering of adhesion to the substrate, formation of voids and decrease of hardness of the hard coating film are sometimes brought about. Further, transparency and haze of the resulting substrate with a hard coating film sometimes become insufficient. Moreover, the effect of promoting curing of the resin for coating material is not further enhanced.

When the content (in terms of $Sb_2O_5$) of the antimony pentaoxide particles in the hard coating film is in the above range, an effect of enhancing adhesion to the substrate, scratch resistance and film hardness and an effect of promoting curing of the film are obtained. By the addition of the antimony pentaoxide, further, the refractive index can be controlled, and hence, occurrence of interference fringe can be inhibited. The interference fringe occurs when the film thickness is not less than the wavelength of light and a difference in the refractive index between the hard coating film and the substrate is not less than 0.1. In case of a transparent substrate, therefore, by the addition of the antimony oxide, control of the refractive index can be easily made and occurrence of interference fringe can be inhibited.

The process for preparing the antimony pentaoxide particles is not specifically restricted, provided that the average particle diameter of the resulting particles is in the above range and a substrate with a hard coating film having sufficient adhesion to the substrate, hardness and scratch resistance can be obtained. The antimony pentaoxide particles can be prepared by a hitherto known process.

For example, a process for preparing an antimony pentaoxide sol disclosed in Japanese Patent Laid-Open Publication No. 180717/1990 applied by the present applicant can be favorably adopted because an antimony pentaoxide sol having uniform particle diameters, excellent stability and excellent transparency is obtained.

In detail, to a mixture of antimony trioxide and an alkali substance in a specific molar ratio, a given amount of hydrogen peroxide is added at a given rate, whereby the antimony pentaoxide sol can be obtained.

When the inorganic oxide fine particle groups and the antimony pentaoxide particles are contained in the hard coating film, the antimony pentaoxide particles are used in the invention in such amounts that the total content of the inorganic oxide fine particle groups and the antimony pentaoxide particles becomes 5 to 90% by weight, preferably 10 to 80% by weight.

If the total content of the inorganic oxide fine particle groups and the antimony pentaoxide particles is too high, the hard coating film does not have excellent adhesion to the substrate, scratch resistance, scratch resistance and pencil hardness in some cases because the amount of the matrix component is small.

As the antimony pentaoxide particles for the invention, an antimony oxide sol disclosed in Japanese Patent Laid-Open Publication No. 180717/1990 applied by the present applicant can be favorably employed.

Furthermore, as the antimony pentaoxide particles, the above described chain particles groups may be used.

Matrix Component

As the matrix component to be contained in the hard coating film, the aforesaid resin matrix is preferably employed.

The resin may be an emulsion resin, a water-soluble resin or a hydrophilic resin. In case of a thermosetting resin, it may be a resin of ultraviolet curing type or electron ray curing type. In case of a thermosetting resin, a curing catalyst may be contained.

Particularly in case of a thermosetting resin, the effect given by the use of both of the inorganic oxide particle groups and the antimony pentaoxide particles (i.e., effect of enhancing adhesion to the substrate, scratch resistance and hardness) is conspicuous.

The thickness of the hard coating film is desired to be in the range of 0.1 to 20 μm, preferably 0.2 to 10 μm, more preferably 0.2 to 5 μm.

If the thickness of the hard coating film is less than the lower limit of the above range, a stress applied to the surface of the hard coating film is not absorbed sufficiently because the thickness of the hard coating film is too small, and as a result, pencil hardness sometimes becomes insufficient.

If the thickness of the hard coating film exceeds the upper limit of the above range, uniform coating or uniform drying becomes difficult, and cracks or voids are liable to occur. Consequently, strength and transparency of the resulting hard coating film sometimes become insufficient.

Especially when the antimony pentaoxide particles are contained, the matrix can be sufficiently cured even if the film thickness is not more than 5 μm, and hence, a substrate with a hard coating film, which is excellent not only in adhesion of the film to the substrate, scratch resistance, film hardness and film strength but also in economical efficiency, can be obtained. Such effects appear in any of the thermosetting (or ultraviolet curing) resins and the thermoplastic resins, and are conspicuous in case of the ultraviolet curing resins.

The hard coating film can be formed by applying a coating liquid containing a matrix-forming component capable of forming the aforesaid matrix-component, the aforesaid inorganic oxide fine particle groups, and if necessary, the antimony pentaoxide particles.

In the preparation of the coating liquid, it is preferable to separately prepare a dispersion in which the inorganic oxide fine particle groups are dispersed in a dispersion medium and a sol in which the antimony pentaoxide particles are dispersed in a dispersion medium, in order to obtain a coating liquid in which particles are homogeneously dispersed.

Each of the inorganic oxide fine particle group dispersion and the antimony pentaoxide particle dispersion sol may be any one of a water dispersion sol and an organic solvent dispersion sol using an organic solvent such as an alcohol as a dispersion medium.

The inorganic oxide fine particle groups and the antimony pentaoxide particles may be those having been surface treated with a silane coupling agent.

The inorganic oxide fine particle group dispersion prepared as above, the antimony pentaoxide particle dispersion sol optionally used, and the matrix-forming component are diluted with an appropriate solvent to prepare a coating liquid for forming a hard coating film. To the coating liquid, a surface active agent may be added to improve dispersibility and stability.

In the coating liquid, further, a solvent capable of dissolving the matrix-forming component and capable of easily evaporating may be contained, or if the matrix-forming component is a thermosetting resin, a curing agent may be contained when needed.

The coating liquid is applied onto the substrate by a known method as previously described, then dried, and then cured in case of a thermosetting resin, whereby a hard coating film can be formed. In case of a thermoplastic resin, heat treatment is further carried out at a temperature lower than the softening point of the substrate when needed, whereby a hard coating film can be formed.

In the substrate with a hard coating film according to the invention, an anti-reflection film may be provided on the hard coating film.

Anti-reflection Film

As the anti-reflection film for use in the invention, a conventionally known anti-reflection film can be used without any restriction, provided that it has anti-reflection properties. Specifically, a film having a lower refractive index than the hard coating film has anti-reflection properties.

Such an anti-reflection film is composed of an anti-reflection film-forming matrix, and if necessary, a low-refractive index component.

The anti-reflection film-forming matrix is a component capable of forming an anti-reflection film, and can be selected taking adhesion to a substrate, hardness and coating properties into consideration.

More specifically, the same matrix component as the aforesaid hard coating film-forming component can be used.

It is also possible to use a hydrolyzable organosilicon compound as a matrix. For example, a partial hydrolyzate of alkoxysilane obtained by adding water and an acid or an alkali as a catalyst to a mixture of alkoxysilane and an alcohol is favorably employed.

As the hydrolyzable organosilicon compound, alkoxysilane represented by the formula $R_nSi(OR')_{4-n}$ (R and R' are each a hydrocarbon group, such as an alkyl group, an aryl group, a vinyl group, an acrylic group or the like, and n is 0, 1, 2 or 3) is employable. In particular, tetraalkoxysilane, such as tetramethoxysilane, tetraethoxysilane or tetraisopropoxysilane, is preferably employed.

Examples of the low-refractive index components which may be optionally added include low-refractive index substances, such as $CaF_2$, NaF, $NaAlF_6$ and MgF, silica type particles (silica particles, silica hollow particles, silica-alumina composite oxide particles) and porous silica type particles.

For example, by the use of composite oxide fine particles obtained by coating surfaces of porous inorganic oxide fine particles with silica, which are disclosed in Japanese Patent Laid-Open Publication No. 133105/1995 applied by the present applicant, an anti-reflection film having a low refractive index and excellent anti-reflection properties can be obtained.

The content of the low-refractive index component in the anti-reflection film is desired to be not more than 90% by weight, preferably not more than 50% by weight. If the content of the low-refractive index component exceeds 90% by weight, film strength is sometimes lowered, or adhesion to the hard coating film (or the later-described intermediate film if the intermediate film is provided) sometimes becomes insufficient.

The thickness of the anti-reflection film is desired to be in the range of 50 to 300 nm, preferably 80 to 200 nm.

If the thickness of the anti-reflection film is less than the lower limit of the above range, film strength and anti-reflection properties are sometimes deteriorated. If the thickness of the anti-reflection film exceeds the upper limit of the above range, cracks are sometimes produced to thereby lower film strength, or anti-reflection properties become insufficient because of too large thickness.

The refractive index of the anti-reflection film is desired to be in the range of usually 1.28 to 1.50, though it varies depending upon the mixing ratio between the low-refractive index component and the matrix such as a resin and the refractive index of the resin used. If the refractive index of the anti-reflection film exceeds 1.50, anti-reflection properties sometimes become insufficient, depending upon the refractive index of the substrate. It is difficult to obtain an anti-reflection film having a refractive index of less than 1.28.

As the anti-reflection film, a film having a lower reactive index than the hard coating film is employed.

The anti-reflection film is formed by applying an anti-reflection film-forming coating liquid containing the anti-reflection film-forming matrix, and if necessary, a low-refractive index component and a solvent.

As the solvent, any solvent can be used without specific restriction, provided that it easily evaporates and exerts no evil influence on the resulting anti-reflection film.

There in no specific limitation on the application method of the anti-reflection film-forming coating liquid, and the coating liquid has only to be applied onto a substrate by a known method, such as dipping, spraying, spinner method or roll coating, and then dried, similarly to the formation of the aforesaid hard coating film. Especially when the forming component is a thermosetting resin, curing of the anti-reflection film may be accelerated by heat treatment, ultraviolet irradiation treatment, electron ray irradiation treatment or the like. When a hydrolyzable organosilicon compound is contained in the forming component, hydrolysis and polycondensation of the hydrolyzable orgnaosilicon compound may be accelerated.

In the present invention, an intermediate film may be provided between the hard coating film and the anti-reflection film. As a difference in the refractive index between films becomes larger, the anti-reflection properties are enhanced. On this account, if the difference in the refractive index between the anti-reflection film and the substrate is small, the anti-reflection properties sometimes become insufficient. Therefore, an intermediate film having a high refractive index is provided.

Intermediate Film

As the intermediate film, a film having a refractive index of not less than 1.6 is provided.

Especially when the refractive index of the substrate or the hard coating film is not more than 1.55, the difference in the refractive index between the substrate or the hard coating film and the anti-reflection film becomes small, and the anti-reflection properties sometimes become insufficient. Therefore, it is preferable to form an intermediate film having a refractive index of not less than 1.6.

The intermediate film is composed of metal oxide fine particles of high refractive index, and if necessary, an intermediate film-forming matrix.

The intermediate film-forming matrix means a component capable of forming an intermediate film on a surface of the hard coating film, and can be selected from resins satisfying the requirements such as adhesion to the hard coating film and coating properties. More specifically, there can be mentioned, for example, the aforesaid hard coating film-forming matrix and the hydrolyzable organosilicon compounds previously exemplified for the anti-reflection film, such as alkoxysilane.

As the metal oxide fine particles of high refractive index, those having a refractive index of not less than 1.60 are preferably employed. The refractive index of the metal oxide fine particles is more preferably not less than 1.70. Examples of such metal oxide fine particles include titanium oxide (refractive-index: 2.5), zinc oxide (refractive index: 2.0), zirconium oxide (refractive index: 2.2), cerium oxide (refractive index: 2.2), tin oxide (refractive index: 2.0), thallium oxide (refractive index: 2.1), barium titanate (refractive index: 2.40), aluminum oxide (refractive index: 1.73), magnesium oxide (refractive index: 1.77), yttrium oxide (refractive index: 1.92), antimony oxide (refractive index: 2.0) and indium oxide (refractive index: 2.0).

Of these, preferable are conductive fine particles, such as titanium oxide, cerium oxide, tin oxide, antimony. oxide, zirconium oxide and indium oxide, and also preferable are conductive fine particles wherein these fine particles are doped with a different element such as antimony, tin or fluorine because the resulting anti-reflection film exhibits an antistatic effect and electromagnetic wave screening properties in addition to the anti-reflection properties.

If the refractive index of the metal oxide fine particles is less than 1.60, the resulting intermediate film does not have a refractive index of not less than 1.60, and the difference in the refractive index between the intermediate film and the anti-reflection film is small. Consequently, the anti-reflection properties become insufficient, and the effect given by providing the intermediate film is not satisfactory.

The metal oxide fine particles have an average particle diameter of preferably 5 to 100 nm. More preferred range of the average particle diameter is 10 to 60 nm. It is sometimes difficult to obtain metal oxide fine particles having an average particle diameter of less than the lower limit of the above range, though it depends upon the type of the metal oxide. If the average particle diameter exceeds the upper limit of the above range, scattering of visible light markedly occurs to thereby lower transparency of the film, so that such an average particle diameter is undesirable.

The content of the metal oxide fine particles in the intermediate film is not specifically restricted, provided that the intermediate film has a refractive index of not less than 1.6. The content of the metal oxide fine particles is desired to be in the range of usually 30 to 100% by weight, preferably 50 to 95% by weight, though it depends upon the intermediate film-forming matrix and the refractive index of the metal oxide fine particles. The intermediate film may be a film composed of only the metal oxide fine particles without containing a matrix.

If the content of the metal oxide fine particles in the intermediate film is low, the intermediate film does not have a refractive index of not less than 1.60 though it depends upon the type of the metal oxide fine particles, and the effect given by providing the intermediate film is not satisfactory.

The intermediate film can be formed by applying an intermediate film-forming coating liquid containing the metal oxide fine particles of high refractive index, and if necessary, an intermediate film-forming matrix and a solvent.

In the preparation of the intermediate film-forming coating liquid using the metal oxide fine particles, it is preferable to use a sol in which the metal oxide fine particles are dispersed in a dispersion medium. For example, a water dispersion sol, an organic solvent dispersion obtained by dispersing the fine particles in an organic solvent such as an alcohol or an organic solvent dispersion obtained by treating the fine particles with a known coupling agent and then dispersing them in an organic solvent, and a resin for coating material are diluted with an appropriate organic solvent to prepare the intermediate film-forming coating liquid. To the coating liquid, a surface active agent may be further added to enhance dispersibility and stability.

There is no specific limitation on the solvent used herein, and any solvent is employable provided that it easily evaporates and exerts no evil influence on the anti-reflection film and the intermediate film.

There is no specific limitation on the application method of the intermediate film-forming coating liquid, similarly to the case of the anti-reflection film-forming coating liquid. The coating liquid has only to be applied onto a substrate by a known method, such as dipping, spraying, spinner method or roll coating, and then dried, similarly to the application of the aforesaid hard coating film-forming coating liquid. Especially when the forming component is a thermosetting resin, curing of the intermediate film may be accelerated by heat treatment, ultraviolet irradiation treatment, electron ray irradiation treatment or the like. When a hydrolyzable organosilicon compound is contained in the forming component, hydrolysis and polycondensation of the hydrolyzable organosilicon compound may be accelerated by heat treatment.

For forming the intermediate film, the hard coating film is first formed on the substrate, and then the intermediate film-forming coating liquid is applied onto the hard coating film, dried and then if necessary heated at a temperature lower than the softening point of the substrate. Thereafter, the aforesaid anti-reflection film is formed on the intermediate film.

Especially when the matrix component is a thermosetting resin, curing acceleration treatment may be carried out after each film (hard coating film, anti-reflection film, intermediate film) is formed, or it is also possible that the intermediate film is formed on the hard coating film, then curing acceleration treatment is carried out, thereafter the anti-reflection film is formed, and then curing acceleration treatment is carried out.

In the substrate with a hard coating film according to the invention, the inorganic oxide fine particle groups are contained in the hard coating film, and therefore, the hard coating film exhibits excellent adhesion to the substrate, scratch resistance and film hardness.

When the inorganic oxide fine particle groups and the antimony pentaoxide particles are contained, static electricity generated is removed by the antimony pentaoxide particles. As a result, adhesion of dust is inhibited, and the hard coating film exhibits excellent adhesion to the substrate, scratch resistance and film hardness.

Hard Coating Film-forming Coating Liquid

The hard coating film-forming coating liquid is described below.

The hard coating film-forming coating liquid according to the invention comprises a matrix-forming component, chain inorganic oxide fine particle groups, and if necessary, antimony pentaoxide particles.

As the inorganic oxide fine particle groups, the antimony pentaoxide particles and the matrix-forming component, the same ones as previously described are employable.

The dispersion medium may be water or an organic solvent such as an alcohol and can be appropriately selected.

In order to prepare a coating liquid in which particles are homogeneously dispersed, it is preferable to use the inorganic oxide fine particles groups in the form of a dispersion in which the fine particle groups are dispersed in a dispersion medium and to use the antimony pentaoxide particles in the form of a sol in which the particles are dispersed in a dispersion medium.

Each of the inorganic oxide fine particle group dispersion and the antimony pentaoxide particle dispersion sol may be any one of a water dispersion sol and an organic solvent dispersion sol using an organic solvent such as an alcohol as a dispersion medium.

The inorganic oxide fine particle groups and the antimony pentaoxide particles may be those having been surface treated with a silane coupling agent.

The inorganic oxide fine particle group dispersion prepared as above, the antimony pentaoxide particle dispersion sol optionally used, and the matrix-forming component are diluted with an appropriate solvent to prepare a coating liquid for forming a hard coating film. To the coating liquid, a surface active agent may be added to enhance dispersibility and stability.

In the coating liquid, further, a solvent capable of dissolving the matrix-forming component and capable of easily evaporating may be contained. When the matrix-forming component is a thermosetting resin, a curing agent may be contained when needed.

The concentration of the matrix-forming component in the hard coating film-forming coating liquid is desired to be in the range of 6 to 36% by weight, preferably 10 to 30% by weight.

If the concentration of the matrix-forming component in the hard coating film-forming coating liquid is low, adhesion of the hard coating film to the substrate becomes insufficient.

If the concentration of the matrix-forming component in the hard coating film-forming coating liquid is high, the thickness of the hard coating film tends to become nonuniform.

The concentration of the matrix-forming component in the hard coating film-forming coating liquid is determined so that the content of the inorganic oxide fine particle groups in the hard coating film should be in the range of 5 to 90% by weight, preferably 10 to 80% by weight. Specifically, the solids concentration is desired to be in the range of 1.5 to 36% by weight, preferably 3 to 32% by weight.

The concentration of the antimony pentaoxide particles optionally used is determined so that the content of the antimony pentaoxide particles in the hard coating film should be in the range of 5 to 80% by weight, preferably 10 to 60% by weight. Specifically, the concentration in terms of $Sb_2O_5$ is in the range of 5 to 50% by weight, preferably 10 to 40% by weight, and the total concentration of $Sb_2O_5$ and the inorganic oxide fine particle groups is in the range of 10 to 80% by weight.

If the concentration of the antimony pentaoxide particles in the hard coating film-forming coating liquid is low, the effect of accelerating curing of the resin for coating material (i.e., matrix component) becomes insufficient. If the concentration of the antimony pentaoxide particles in the hard coating film-forming coating liquid is high, adhesion of the hard coating film to the substrate is lowered, or voids are produced to thereby lower hardness of the hard coating film.

Effect of the Invention

According to the present invention, a chain inorganic oxide fine particle group is obtained.

When the inorganic oxide is antimony oxide, the chain antimony oxide fine particle group has a lower volume resistance value than monodisperse antimony oxide fine particles because of a chain form, and a transparent film excellent in adhesion to a substrate, antistatic properties, hard coating function, etc. can be formed.

When a chain inorganic oxide fine particle group of silica or silica-alumina type is contained in a film formed on a surface of a substrate, the film functions as a hard coating film having excellent adhesion to the substrate and showing excellent scratch resistance, excellent film hardness and the like. When the inorganic oxide fine particle group and antimony pentaoxide particles are contained in the film (hard coating film), the film is further improved in the adhesion to the substrate, scratch resistance and film hardness and shows excellent antistatic properties and economical efficiency even if the film is thin. Hence, a substrate with a film, which is prevented from occurrence of interference fringe, can be obtained.

When an anti-reflection film is further formed on a surface of the film or when an intermediate film is further formed between the film (hard coating film) and the anti-reflection film, marring or adhesion of foreign matters such as dust does not occur, and a substrate with a hard coating film, which is excellent in transparency and haze, can be obtained in good yield.

EXAMPLES

The present invention is further described with reference to the following examples.

Example A1

Preparation of Chain Antimony Oxide Fine Particle Group Dispersion (1)

In a solution obtained by dissolving 57 g of potassium hydroxide (available from Asahi Glass Co., Ltd., purity: 85% by weight) in 1800 g of pure water, 111 g of antimony trioxide (Sumitomo Metal Mining Co., Ltd., KN purity: 98.5% by weight) was suspended. The suspension was heated to 95° C., and to the suspension, an aqueous solution obtained by diluting 32.8 g of hydrogen peroxide water (available from Hayashi Junyaku K.K., special grade, purity: 35% by weight) with 110.7 g of pure water was added (0.1 mol/hr) over a period of 9 hours to dissolve antimony trioxide, followed by aging for 11 hours. After cooling, 1000 g of the resulting solution was weighed out, and the solution was diluted with 6000 g of pure water and then passed through a cation exchange resin layer (available from Mitsubishi Chemical Corporation, pk-216) to perform deionization. At this time, the solution had pH of 2.1 and an electrical conductivity of 2.4 mS/cm.

Then, the solution was passed through an anion exchange resin layer (available from Mitsubishi Chemical Corporation, SA-20A) to perform deionization until the solution had pH of 2.5 and an electrical conductivity of 1.0 mS/cm.

The solution obtained by the deionization was aged at a temperature of 70° C. for 10 hours and then concentrated by the use of an ultrafilter to prepare a chain antimony oxide fine particle group dispersion (1) having a solids concentration of 14% by weight (in terms of antimony oxide). The resulting chain antimony oxide fine particle group dispersion (1) had pH of 3.0 and an electrical conductivity of 0.1 mS/cm.

Further, an electron microscope photograph was taken, and 100 particles were examined. As a result, the average particle diameter of the antimony oxide fine particles (primary particles) was 15 nm, and the average connection number thereof was 5.

Preparation of Hard Coating Film-forming Coating Liquid (H-1)

The chain antimony oxide fine particle group dispersion (1) was subjected to solvent replacement to replace water with an ethyl cellosolve/ethanol mixed solvent (weight ratio: 44/66) and thereby adjust the solids concentration to 20% by weight.

With 200 g of the dispersion, 203 g of an ultraviolet curing resin (available from Dainippon Ink & Chemicals, Inc., Unidic 17-824-9, solids concentration: 79% by weight) and 264 g of ethyl cellosolve were mixed, to prepare a hard coating film-forming coating liquid (H-1).

Preparation of Substrate (F-1) with Hard Coating Film

The hard coating film-forming coating liquid (H-1) was applied onto a PET film (thickness: 188 μm, refractive index: 1.65) by a bar coater method, dried at 80° C. for 1 minute and then cured by irradiation with a high-pressure mercury lamp (80 W/cm) for 1 minute, to prepare a substrate (F-1) with a hard coating film. The thickness of the hard coating film was 5 μm.

Surface resistance of the hard coating film was measured by a surface resistance meter (manufactured by Mitsubishi Chemical Corporation, Hiresta). The result is set forth in Table 1.

Further, total light transmittance and haze were measured by a haze meter (manufactured by Suga Test Machine K.K.). The results are set forth in Table 1.

Furthermore, pencil hardness, scratch resistance and adhesion properties were evaluated in the following manner and based on the following criteria. The results are set forth in Table 1.

Measurement of Pencil Hardness

The pencil hardness was measured by a pencil hardness tester in accordance with JIS-K-5400.

Measurement of Scratch Resistance

Steel wool of #0000 was allowed to slide on the substrate with a hard coating film 50 times under a load of 500 g/cm$^2$. Then, the surface of the film was visually observed, and the scratch resistance was evaluated based on the following criteria. The result is set forth in Table 1.

Evaluation Criteria

AA: No scratch line is observed.
BB: Some scratch lines are observed.
CC: Many scratch lines are observed.
DD: The film surface is wholly abraded.

Adhesion Properties

On a surface of the substrate (F-1) with a hard coating film, 11 parallel cut lines were made with a knife in the crosswise and lengthwise directions at regular intervals of 1 mm to form 100 squares, and a Cellophane tape (trademark) was applied onto the film surface. Then, the Cellophane tape (trademark) was peeled off, and the squares of the film remaining on the substrate were counted. The number of the remaining squares was classified, in any one of the following four classes to evaluate adhesion properties. The result is set forth in Table 1.

AA: The number of the remaining squares is 95 or more.
BB: The number of the remaining squares is 90 to 94.
CC: The number of the remaining squares is 85 to 89.
DD: The number of the remaining squares is 84 or less.

Example A2

Preparation of Chain Antimony Oxide Fine Particle Group Dispersion (2)

A chain antimony oxide fine particle group dispersion (2) was prepared in the same manner as in Example A1, except that the deionization by passing the solution through an anion exchange resin was carried out until the solution had pH of 2.8 and an electrical conductivity of 0.5 mS/cm. The average particle diameter of the antimony oxide fine particles (primary particles) was 15 nm, and the average connection number thereof was 10.

Preparation of Substrate (F-2) with Hard Coating Film

A hard coating film (transparent film)-forming coating liquid (H-2) was prepared in the same manner as in Example A1, except that the chain antimony oxide fine particle group dispersion (2) was used. Then, a substrate (F-2) with a hard coating film was prepared in the same manner as in Example A1, except that the coating liquid (H-2) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Example A3

Preparation of Chain Antimony Oxide Fine Particle Group Dispersion (3)

A chain antimony oxide fine particle group dispersion (3) was prepared in the same manner as in Example A1, except that the deionization by passing the solution through an anion exchange resin was carried out until the solution had pH of 5.0 and an electrical conductivity of 0.5 mS/cm. The average particle diameter of the antimony oxide fine particles (primary particles) was 15 nm, and the average connection number thereof was 15.

Preparation of Substrate (F-3) with Hard Coating Film

A hard coating film (transparent film)-forming coating liquid (H-3) was prepared in the same manner as in Example A1, except that the chain antimony oxide fine particle group dispersion (3) was used. Then, a substrate (F-3) with a hard coating film was prepared in the same manner as in Example A1, except that the coating liquid (H-3) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Example A4

Preparation of Chain Antimony Oxide Fine Particle Group Dispersion (4)

In a solution obtained by dissolving 57 g of potassium hydroxide (available from Asahi Glass Co., Ltd., purity: 85% by weight) in 1800 g of pure water, 111 g of antimony trioxide (Sumitomo Metal Mining Co., Ltd., KN purity: 98.5% by weight) was suspended. The suspension was heated to 95° C., and to the suspension, an aqueous solution obtained by diluting 59.2 g of hydrogen peroxide water (available from Hayashi Junyaku K.K., special grade, purity: 35% by weight) with 194.9 g of pure water was added (0.27 mol/hr) over a period of 6 hours to dissolve antimony trioxide, followed by aging for 14 hours. After cooling, 1000 g of the resulting solution was weighed out, and the solution was diluted with 6000 g of pure water and then passed through a cation exchange resin layer (available from Mitsubishi Chemical Corporation, pk-216) to perform deionization. At this time, the solution had pH of 2.2 and an electrical conductivity of 2.3 mS/cm.

Then, the solution was passed through an anion exchange resin layer (available from Mitsubishi Chemical Corporation, SA-20A) to perform deionization until the solution had pH of 2.5 and an electrical conductivity of 1.0 mS/cm.

The solution obtained by the deionization was aged at a temperature of 70° C. for 10 hours and then concentrated by the use of an ultrafilter to prepare a chain antimony oxide fine particle group dispersion (4) having a solids concentration of 14% by weight. The resulting chain antimony oxide fine particle group dispersion (4) had pH of 3.2 and an electrical conductivity of 0.1 mS/cm.

Further, an electron microscope photograph was taken, and 100 particles were examined. As a result, the average particle diameter of the antimony oxide fine particles (primary particles) was 20 nm, and the average connection number thereof was 5.

Preparation of Substrate (F-4) with Hard Coating Film

A hard coating film (transparent film)-forming coating liquid (H-4) was prepared in the same manner as in Example A1, except that the chain antimony oxide fine particle group dispersion (4) was used. Then, a substrate (F-4) with a hard coating film was prepared in the same manner as in Example A1, except that the coating liquid (H-4) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Example A5

Preparation of Chain Antimony Oxide Fine Particle Group Dispersion (5)

In a solution obtained by dissolving 57 g of potassium hydroxide (available from Asahi Glass Co., Ltd., purity: 85% by weight) in 1800 g of pure water, 111 g of antimony trioxide (Sumitomo Metal Mining Co., Ltd., KN purity: 98.5% by weight) was suspended. The suspension was heated to 95° C., and to the suspension, an aqueous solution obtained by diluting 59.2 g of hydrogen peroxide water (available from Hayashi Junyaku K.K., special grade, purity: 35% by weight) with 194.9 g of pure water was added (0.27 mol/hr) over a period of 6 hours to dissolve antimony trioxide, followed by aging for 14 hours. After cooling, 1000 g of the resulting solution was weighed out, and the solution was diluted with 6000 g of pure water and then passed through a cation exchange resin layer (available from Mitsubishi Chemical Corporation, pk-216) to perform deionization. At this time, the solution had pH of 2.2 and an electrical conductivity of 2.4 mS/cm.

Then, the solution was passed through an anion exchange resin layer (available from Mitsubishi Chemical Corporation, SA-20A) to perform deionization until the solution had pH of 2.8 and an electrical conductivity of 0.5 mS/cm.

The solution obtained by the deionization was aged at a temperature of 70° C. for 10 hours and then concentrated by the use of an ultrafilter to prepare a chain antimony oxide fine particle group dispersion (5) having a solids concentration of 14% by weight. The resulting chain antimony oxide fine particle group dispersion (5) had pH of 3.3 and an electrical conductivity of 0.1 mS/cm.

Further, an electron microscope photograph was taken, and 1.00 particles were examined. As a result, the average particle diameter of the antimony oxide fine particles (primary particles) was 20 nm, and the average connection number thereof was 10.

Preparation of Substrate (F-5) with Hard Coating Film

A hard coating film (transparent film)-forming coating liquid (H-5) was prepared in the same manner as in Example A1, except that the chain antimony oxide fine particle group dispersion (5) was used. Then, a substrate (F-5) with a hard coating film was prepared in the same manner as in Example A1, except that the coating liquid (H-5) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Example A6

Preparation of Hard Coating Film-forming Coating Liquid (H-6)

The chain antimony oxide fine particle group dispersion (5) was subjected to solvent replacement to replace water with an ethyl cellosolve/ethanol mixed solvent (weight ratio: 44/66) and thereby adjust the solids concentration to 20% by weight.

With 200 g of the dispersion, 50.6 g of an ultraviolet curing resin (available from Dainippon Ink & Chemicals, Inc., Unidic 17-824-9, solids concentration: 79% by weight) and 16.1 g of ethyl cellosolve were mixed, to prepare a hard coating film-forming coating liquid (H-6).

Preparation of Substrate (F-6) with Hard Coating Film

A substrate (F-6) with a hard coating film was prepared in the same manner as in Example A1, except that the hard coating film (transparent film)-forming coating liquid (H-6) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Example A7

Preparation of Hard Coating Film-forming Coating Liquid (H-7)

The chain antimony oxide fine particle group dispersion (5) was subjected to solvent replacement to replace water with an ethyl cellosolve/ethanol mixed solvent (weight ratio: 44/66) and thereby adjust the solids concentration to 20% by weight.

With 200 g of the dispersion, 40 g of an acrylic resin (available from Hitachi Kasei K.K., Hitaloid 1007) and 26.7 g of ethyl cellosolve were mixed, to prepare a hard coating film-forming coating liquid (H-7).

Preparation of Substrate (F-7) with Hard Coating Film

A substrate (F-7) with a hard coating film was prepared in the same manner as in Example A1, except that the hard coating film (transparent film)-forming coating liquid (H-7) was used. The thickness of the hard coating film was 5 μm.

The resulting hard-coating film was evaluated on the surface resistance, total light transmittance, haze, pencil hardness, scratch resistance and adhesion properties. The results are set forth in Table 1.

Example A8

Preparation of Chain Antimony Oxide Fine Particle Group Dispersion (6)

A chain antimony oxide fine particle group dispersion (6) was prepared in the same manner as in Example A5, except that the deionization by passing the solution through an anion exchange resin was carried out until the solution had pH of 5.0 and an electrical conductivity of 0.5 mS/cm. The resulting chain antimony oxide fine particle group dispersion (6) had pH of 6.5 and an electrical conductivity of 0.1 mS/cm.

Further, an electron microscope photograph was taken, and 100 particles were examined. As a result, the average particle diameter of the antimony oxide fine particles (primary particles) was 20 nm, and the average connection number thereof was 15.

Preparation of Substrate (F-8) with Hard Coating Film

A hard coating film (transparent film)-forming coating liquid (H-8) was prepared in the same manner as in Example A1, except that the chain antimony oxide fine particle group dispersion (6) was used. Then, a substrate (F-8) with a hard coating film was prepared in the same manner as in Example A1, except that the coating liquid (H-8) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Example A9

Preparation of Chain Antimony Oxide Fine Particle Group Dispersion (7).

In a solution obtained by dissolving 57 g of potassium hydroxide (available from Asahi Glass Co., Ltd., purity: 85% by weight) in 1800 g of pure water, 111 g of antimony trioxide (Sumitomo Metal Mining Co., Ltd., KN purity: 98.5% by weight) was suspended. The suspension was heated to 95° C., and to the suspension, an aqueous solution obtained by diluting 72.9 g of hydrogen peroxide water (available from Hayashi Junyaku K.K., special grade, purity: 35% by weight) with 246 g of pure water was added (0.29 mol/hr) over a period of 7 hours to dissolve antimony trioxide, followed by aging for 13 hours. After cooling, 1000 g of the resulting solution was weighed out, and the solution was diluted with 6000 g of pure water and then passed through a cation exchange resin layer (available from Mitsubishi Chemical Corporation, pk-216) to perform deionization. At this time, the solution had pH of 2.0 and an electrical conductivity of 3.0 mS/cm.

Then, the solution was passed through an anion exchange resin layer (available from Mitsubishi Chemical Corporation, SA-20A) to perform deionization until the solution had pH of 2.8 and an electrical conductivity of 0.5 mS/cm.

The solution obtained by the deionization was aged at a temperature of 70° C. for 10 hours and then concentrated by the use of an ultrafilter to prepare a chain antimony oxide fine particle group dispersion (7) having a solids concentration of 14% by weight. The resulting chain antimony oxide fine particle group dispersion (7) had pH of 3.2 and an electrical conductivity of 0.2 mS/cm.

Further, an electron microscope photograph was taken, and 100 particles were examined. As a result, the average particle diameter of the antimony oxide fine particles (primary particles) was 35 nm, and the average connection number thereof was 10.

Preparation of Substrate (F-9) with Hard Coating Film

A hard coating film (transparent film)-forming coating liquid (H-9) was prepared in the same manner as in Example A1, except that the chain antimony oxide fine particle group dispersion (7) was used. Then, a substrate (F-9) with a hard coating film was prepared in the same manner as in Example A1, except that the coating liquid (H-9) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Example A10

Preparation of Chain Antimony Oxide Fine Particle Group Dispersion (8)

In a solution obtained by dissolving 57 g of potassium hydroxide (available from Asahi Glass Co., Ltd., purity: 85% by weight) in 1800 g of pure water, 111 g of antimony trioxide (Sumitomo Metal Mining Co., Ltd., KN purity: 98.5% by weight) was suspended. The suspension was heated to 95° C., and to the suspension, an aqueous solution obtained by diluting 59.2 g of hydrogen peroxide water (available from Hayashi Junyaku K.K., special grade, purity: 35% by weight) with 194.9 g of pure water was added (0.27 mol/hr) over a period of 6 hours to dissolve antimony trioxide, followed by aging for 14 hours. After cooling, 1000 g of the resulting solution was weighed out, and the solution was diluted with 6000 g of pure water and then passed through a cation exchange resin layer (available from Mitsubishi Chemical Corporation, pk-216) to perform deionization. At this time, the solution had pH of 2.1 and an electrical conductivity of 3.1 mS/cm.

Then, ammonia water having a concentration of 3% by weight was added to the solution to adjust pH of the solution to 5.0. At this time, the solution had an electrical conductivity of 4.5 mS/cm.

The resulting solution was aged at a temperature of 70° C. for 10 hours, then passed through an anion exchange resin layer (available from Mitsubishi Chemical Corporation, SA-20A) to perform deionization until the solution had pH of 3.0 and an electrical conductivity of 0.4 mS/cm, and concentrated by the use of an ultrafilter to prepare a chain antimony oxide fine particle group dispersion (8) having a solids concentration of 14% by weight. The resulting chain antimony oxide fine particle group dispersion (8) had pH of 3.8 and an electrical conductivity of 0.5 mS/cm.

Further, an electron microscope photograph was taken, and 100 particles were examined. As a result, the average particle diameter of the antimony oxide fine particles (primary particles) was 20 nm, and the average connection number thereof was 20.

Preparation of Hard Coating Film (Transparent Film)-Forming Coating Liquid (H-10)

A hard coating film (transparent film)-forming coating liquid (H-10) was prepared in the same manner as in Example A1, except that the chain antimony oxide fine particle group dispersion (8) was used. Then, a substrate (F-10) with a hard coating film was prepared in the same manner as in Example A1, except that the coating liquid (H-10) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Comparative Example A1

Preparation of Hard Coating Film-forming Coating Liquid (RH-1)

A hard coating film-forming coating liquid (RH-1) was prepared by mixing 380 g of an ultraviolet curing resin (available from Dainippon Ink & Chemicals, Inc., Unidic 17-824-9, solids-concentration: 79% by weight) with 620 g of ethyl cellosolve.

Preparation of Substrate (RF-1) with Hard Coating Film

A substrate (RF-1) with a hard coating film was prepared in the same manner as in Example A1, except that the hard coating film-forming coating liquid (RH-1) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Comparative Example A2

Preparation of Hard Coating Film-forming Coating Liquid (RH-2)

A hard coating film-forming coating liquid (RH-2) was prepared by mixing 300 g of an acrylic resin (available from Hitachi Kasei K.K., Hitaloid 1007) with 700 g of ethyl cellosolve.

Preparation of Substrate (RF-2) with Hard Coating Film

A substrate (RF-2) with a hard coating film was prepared in the same manner as in Example A1, except that the hard coating film-forming coating liquid (RH-2),was used. The thickness of the hard coating film was 5 μm.

The resulting hard coating film was evaluated on the surface resistance, total light transmittance, haze, pencil hardness, scratch resistance and adhesion properties. The results are set forth in Table 1.

Comparative Example A3

Preparation of Hard Coating Film-forming Coating Liquid (RH-3)

A hard coating film-forming coating liquid (RH-3) was prepared by mixing 200 g of a silica organosol (available from Catalysts & Chemicals Industries Co., Ltd., OSCAL-1432, average particle diameter: 12 nm, $SiO_2$ concentration: 20% by weight, dispersion medium: isopropyl alcohol) with 203 g of an ultraviolet curing resin (available from Dainippon Ink & Chemicals, Inc., Unidic 17-824-9, solids concentration: 79% by weight) and 264 g of ethyl cellosolve.

Preparation of Substrate (RF-3) with Hard Coating Film

A substrate (RF-3) with a hard coating film was prepared in the same manner as in Example A1, except that the hard coating film-forming coating liquid (RH-3) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Comparative Example A4

Preparation of Hard Coating Film-forming Coating Liquid (RH-4)

Antimony trioxide particles (average particle diameter: 150 μm) were dispersed in isopropyl alcohol in such a manner that the concentration became 30% by weight, followed by pulverization by a sand mill at 30° C. for 5 hours. Then, isopropyl alcohol was added to prepare an antimony trioxide fine particle dispersion (average particle diameter: 50 nm) having a concentration of 20% by weight. With 200 g of the dispersion, 203 g of an ultraviolet curing resin (available from Dainippon Ink & Chemicals, Inc., Unidic 17-824-9, solids concentration: 79% by weight) and 264 g of ethyl cellosolve were mixed, to prepare a hard coating film-forming coating liquid (RH-4). (The antimony oxide particles were not connected in the form of a chain.)

Preparation of Substrate (RF-4) with Hard Coating Film

A substrate (RF-4) with a hard coating film was prepared in the same manner as in Example A1, except that the hard coating film-forming coating liquid (RH-4) was used. The thickness of the hard coating film was 5 μm.

The resulting hard coating film was evaluated on the surface resistance, total light transmittance, haze, pencil hardness, scratch resistance and adhesion properties. The results are set forth in Table 1.

Comparative Example A5

Preparation of Antimony Oxide Fine Particle Dispersion (RP-1)

In a solution obtained by dissolving 57 g of potassium hydroxide (available from Asahi Glass Co., Ltd., purity: 85% by weight) in 1800 g of pure water, 111 g of antimony trioxide (Sumitomo Metal Mining Co., Ltd., KN purity: 98.5% by weight) was suspended. The suspension was heated to 95° C., and to the suspension, an aqueous solution obtained by diluting 59.2 g of hydrogen peroxide water (available from Hayashi Junyaku K.K., special grade, purity: 35% by weight) with 194.9 g of pure water was added (0.27 mol/hr) over a period of 6 hours to dissolve antimony trioxide, followed by aging for 14 hours. After cooling, 1000 g of the resulting solution was weighed out, and the solution was diluted with 6000 g of pure water and then passed through a cation exchange resin layer (available from Mitsubishi Chemical Corporation, pk-216) to perform deionization. At this time, the solution had pH of 2.0 and an electrical conductivity of 3.1 mS/cm.

Then, the resulting solution was aged at a temperature of 70° C. for 10 hours and then concentrated by the use of an ultrafilter to prepare an antimony oxide fine particle dispersion (R-1) having a solids concentration of 14% by weight. The resulting antimony oxide fine particle dispersion. (R-1) had pH of 2.1 and an electrical conductivity of 1.2 mS/cm.

Further, an electron microscope photograph was taken, and 100 particles were examined. As a result, the average particle diameter of the antimony oxide fine particles was 20 nm.

Preparation of Hard Coating Film (Transparent Film)-Forming Coating Liquid (RH-5)

The antimony oxide fine particle dispersion (R-1) was subjected to solvent replacement to replace water with an ethyl cellosolve/ethanol mixed solvent (weight ratio: 44/66) and thereby adjust the solids concentration to 20% by weight.

With 200 g of the dispersion, 203 g of an ultraviolet curing resin (available from Dainippon Ink & Chemicals, Inc., Unidic 17-824-9, solids concentration: 79% by weight) and 264 g of ethyl cellosolve were mixed, to prepare a hard coating film-forming coating liquid (RH-5).

Preparation of Substrate (RF-5) with Hard Coating Film

A substrate (RF-5) with a hard coating film was prepared in the same manner as in Example A1, except that the hard coating film (transparent film)-forming coating liquid (RH-5.) was used. The thickness of the hard coating film was 5 μm.

The resulting hard coating film was evaluated on the surface resistance, total light transmittance, haze, pencil hardness, scratch resistance and adhesion properties. The results are set forth in Table 1.

TABLE 1

| | | Chain antimony oxide fin particles | | | | Matrix | | Substrate with film (properties) | | | | | |
|---|---|---|---|---|---|---|---|---|---|---|---|---|---|
| | | Primary particles | | Volume | | | | Total | | | | | |
| | Substrate | Average particle diameter (nm) | Connection number (particles) | resistance value (Ω·cm) | Content (wt %) | Type | Content (wt %) | light transmittance (%) | Haze (%) | Pencil hardness | Scratch resistance | Adhesion properties | Surface resistance (Ω/□) |
| Ex. A1 | PET | 15 | 5 | 50 | 20 | ultraviolet curing resin | 80 | 91.8 | 1.2 | 3H | AA | AA | 5.0E+09 |
| Ex. A2 | PET | 15 | 10 | 30 | 20 | ultraviolet curing resin | 80 | 91.6 | 1.3 | 3H | AA | AA | 3.0E+09 |
| Ex. A3 | PET | 15 | 15 | 20 | 20 | ultraviolet curing resin | 80 | 91.6 | 1.4 | 3H | AA | AA | 1.0E+09 |
| Ex. A4 | PET | 20 | 5 | 200 | 20 | ultraviolet curing resin | 80 | 92.0 | 1.3 | 3H | AA | AA | 8.0E+09 |
| Ex. A5 | PET | 20 | 10 | 100 | 20 | ultraviolet curing resin | 80 | 91.9 | 1.3 | 3H | AA | AA | 5.0E+09 |
| Ex. A6 | PET | 20 | 10 | 100 | 50 | ultraviolet curing resin | 50 | 91.8 | 1.4 | 4H | AA | AA | 8.0E+08 |
| Ex. A7 | PET | 20 | 10 | 100 | 50 | acrylic resin | 50 | 91.7 | 1.5 | 2H | BB | BB | 6.0E+08 |
| Ex. A8 | PET | 20 | 15 | 80 | 20 | ultraviolet curing resin | 80 | 91.7 | 1.4 | 3H | AA | AA | 3.0E+09 |
| Ex. A9 | PET | 35 | 10 | 500 | 20 | ultraviolet curing resin | 80 | 91.5 | 1.6 | 3H | AA | AA | 6.0E+09 |
| Ex. A10 | PET | 20 | 20 | 50 | 20 | ultraviolet curing resin | 80 | 91.8 | 1.5 | 3H | AA | AA | 1.0E+09 |
| Comp. Ex. A1 | PET | — | — | — | — | ultraviolet curing resin | 100 | 92.0 | 1.2 | 2H | CC | DD | 1.0E+14 or more |
| Comp. Ex. A2 | PET | — | — | — | — | acrylic resin | 100 | 91.8 | 1.2 | 1H | DD | DD | 1.0E+14 or more |
| Comp. Ex. A3 | PET | 12 monodisperse $SiO_2$ | — | 106 | 20 | ultraviolet curing resin | 80 | 91.0 | 1.3 | 2H | BB | CC | 1.0E+14 or more |
| Comp. Ex. A4 | PET | 50 monodisperse $Sb_2O_3$ | — | 106 | 20 | ultraviolet curing resin | 80 | 91.0 | 1.8 | 2H | BB | CC | 1.0E+14 or more |
| Comp. Ex. A5 | PET | 20 monodisperse $Sb_2O_5$ | — | 1000 | 20 | ultraviolet curing resin | 80 | 91.9 | 1.2 | 3H | BB | CC | 1.0E+10 |

Example B1

Preparation of Inorganic Oxide Particle Group (1)

To 2000 g of a silica sol (available from Catalysts & Chemicals Industries Co., Ltd., SI-550, average particle diameter: 5 nm, $SiO_2$ concentration: 20% by weight, Na in silica: 2700 ppm), 6000 g of ion-exchanged water was added, then 400 g of a cation exchange resin (available from Mitsubishi Chemical Corporation, SK-1BH) was added, and they were stirred for 1 hour to perform dealkalization. After the cation exchange resin was separated, 400 g of an anion exchange resin (available from Mitsubishi Chemical Corporation, SANUPC) was added to the dispersion, and they were stirred for 1 hour to perform deanionization. Then, 400 g of a cation exchange resin (available from Mitsubishi Chemical Corporation, SK-1BH) was added to the dispersion again, and they were stirred for 1 hour to perform dealkalization. Thus, a silica particle (RA) dispersion having a $SiO_2$ concentration of 5% by weight was prepared. (At this time, the Na content in the silica particles was 200 ppm.)

Subsequently, the dispersion was adjusted to pH 4.0 by the use of dilute hydrochloric acid and then treated at 200° C. for 1 hour in an autoclave. To the dispersion, a cation exchange resin was added at room temperature, and they were stirred for 1 hour to perform dealkalization. After the cation exchange resin was separated, an anion exchange resin was added to the dispersion, and they were stirred for 1 hour to perform deanionization. Thus, an inorganic oxide particle group (1) dispersion having a $SiO_2$ concentration of 5% by weight was prepared. An average connection number of the inorganic oxide particle group is set forth in Table 2.

Then, the inorganic oxide particle group (1) dispersion having a $SiO_2$ concentration of 5% by weight was concentrated to a $SiO_2$ concentration of 20% by weight, and then the dispersion was subjected to solvent replacement with methanol by an ultrafilter method to prepare an inorganic oxide particle group (1) methanol dispersion having a $SiO_2$ concentration of 20% by weight.

Preparation of Hard Coating Film-forming Coating Liquid (H-1)

With 111.5 g of the inorganic oxide particle group (1) methanol dispersion, 160 g of an ultraviolet curing resin (available from Dainippon Ink & Chemicals, Inc., Unidic 17-824-9, solids concentration: 79% by weight) and 224 g of ethyl cellosolve were mixed, to prepare a hard coating film-forming coating liquid (H-1).

Preparation of Substrate (F-1) with Hard Coating Film

The hard coating film-forming coating liquid (H-1) was applied onto a PET film (thickness: 188 mm, refractive index: 1.65) by a bar coater method, dried at 80° C. for 1 minute and then cured by irradiation with a high-pressure mercury lamp (80 W/cm) for 1 minute, to prepare a substrate (F-1) with a hard coating film. The thickness of the hard coating film was 5 μm.

Surface resistance of the resulting hard coating film was measured by a surface resistance meter (manufactured by Mitsubishi Chemical Corporation, Hiresta). The result is set forth in Table 2.

Further, total light transmittance and haze were measured in the same manner as in the aforesaid examples and comparative examples. The results are set forth in Table 2.

Furthermore, pencil hardness, scratch resistance and adhesion properties were evaluated in the same manner as in the aforesaid examples and comparative examples. The results are set forth in Table 2.

Example B2

Preparation of Hard Coating Film-forming Coating Liquid (H-2)

With 271 g of the inorganic oxide particle group (1) methanol dispersion, 160 g of an ultraviolet curing resin (available from Dainippon Ink & Chemicals, Inc., Unidic 17-824-9, solids concentration: 79% by weight) and 171 g of ethyl cellosolve were mixed, to prepare a hard coating film-forming coating liquid (H-2).

Preparation of Substrate (F-2) with Hard Coating Film

A substrate (F-2) with a hard coating film was prepared in the same manner as in Example B1, except that the hard coating film-forming coating liquid (H-2) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Example B3

Preparation of Hard Coating Film-forming Coating Liquid (H-3)

With 1475 g of the inorganic oxide particle group (1) methanol dispersion, 160 g of an ultraviolet curing resin (available from Dainippon Ink & Chemicals, Inc., Unidic 17-824-9, solids concentration: 79% by weight) and 197 g of ethyl cellosolve were mixed, to prepare a hard coating film-forming coating liquid (H-3).

Preparation of Substrate (F-3) with Hard Coating Film

A substrate (F-3) with a hard coating film was prepared in the same manner as in Example B1, except that the hard coating film-forming coating liquid (H-3) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Example B4

Preparation of Hard Coating Film-Forming Coating Liquid (H-4)

With 316 g of the inorganic oxide particle group (1) methanol dispersion, 160 g of an ultraviolet curing resin (available from Dainippon Ink & Chemicals, Inc., Unidic 17-824-9, solids concentration: 79% by weight), 156 g of ethyl cellosolve and 632 g of an antimony pentaoxide particle dispersion (available from Catalysts & Chemicals Industries Co., Ltd., ELCOMPC-14, average particle diameter: 20 nm, $Sb_2O_5$ concentration: 20% by weight, dispersion medium: ethyl cellosolve/ethanol (34/66 by weight)) were mixed, to prepare a hard coating film-forming coating liquid (H-4)

Preparation of Substrate (F-4) with Hard Coating Film

A substrate (F-4) with a hard coating film was prepared in the same manner as in Example B1, except that the hard coating film-forming coating liquid (H-4) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Example B5

Preparation of Inorganic Oxide Particle Group (2)

To 2000 g of a silica sol (available from Catalysts & Chemicals Industries Co., Ltd., SI-550, average particle diameter: 5 nm, $SiO_2$ concentration: 20% by weight, Na in silica: 2700 ppm), 6000 g of ion-exchanged water was added, then 400 g of a cation exchange resin (available from Mitsubishi Chemical Corporation, SK-1BH) was added, and they were stirred for 1 hour to perform dealkalization. After the cation exchange resin was separated, 400 g of an anion exchange resin (available from Mitsubishi Chemical Corporation, SANUPC) was added to the dispersion, and they were stirred for 1 hour to perform deanionization. Then, 400 g of a cation exchange resin (available from Mitsubishi Chemical Corporation, SK-1BH) was added to the dispersion again, and they were stirred for 1 hour to perform dealkalization. Thus, a silica particle (RA) dispersion having a $SiO_2$ concentration of 5% by weight was prepared. (At this time, the Na content in the silica particles was 200 ppm.)

Subsequently, the dispersion was adjusted to pH 4.0 by the use of dilute hydrochloric acid and then treated at 200° C. for 1 hour in an autoclave. To the dispersion, a cation exchange-resin was added at room temperature, and they were stirred for 1 hour to perform dealkalization. After the cation exchange resin was separated, an anion exchange resin was added to the dispersion, and they were stirred for 1 hour to perform deanionization. Thus, an inorganic oxide particle group (2) dispersion having a $SiO_2$ concentration of 5% by weight was prepared. An average connection number of the inorganic oxide particle group is set forth in Table 2.

Then, the inorganic oxide particle group (2) dispersion having a $SiO_2$ concentration of 5% by weight was concentrated to a $SiO_2$ concentration of 20% by weight, and then the dispersion was subjected to solvent replacement with methanol by an ultrafilter method to prepare an inorganic oxide particle group (2) methanol dispersion having a $SiO_2$ concentration of 20% by weight.

Preparation of Hard Coating Film-forming Coating Liquid (E-5)

With 1475 g of the inorganic oxide particle group (2) methanol dispersion, 160 g of an ultraviolet curing resin (available from Dainippon Ink & Chemicals, Inc., Unidic 17-824-9, solids concentration: 79% by weight) and 156 g of ethyl cellosolve were mixed, to prepare a hard coating film-forming coating liquid (H-5).

Preparation of Substrate (F-5) with Hard Coating Film

A substrate (F-5) with a hard coating film was prepared in the same manner as in Example B1, except that the hard coating film-forming coating liquid (H-5) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Example B6

Preparation of Hard Coating Film-forming Coating Liquid (H-6)

With 316 g of the inorganic oxide particle group (2) methanol dispersion, 160 g of an ultraviolet curing resin (available from Dainippon Ink & Chemicals, Inc., Unidic 17-824-9, solids concentration: 79% by weight), 156 g of ethyl cellosolve and 632 g of an antimony pentaoxide particle dispersion (available from Catalysts & Chemicals Industries Co., Ltd., ELCOMPC-14, average particle diameter: 20 nm, $Sb_2O_5$ concentration: 20% by weight, dispersion medium: ethyl cellosolve/ethanol (34/66 by weight)) were mixed, to prepare a hard coating film-forming coating liquid (H-6).

Preparation of Substrate (F-6) with Hard Coating Film

A substrate (F-6) with a hard coating film was prepared in the same manner as in Example B1, except that the hard coating film-forming coating liquid (H-6) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Example B7

Preparation of Hard Coating Film-forming Coating Liquid (H-7)

With 271 g of an inorganic oxide particle group (1) methanol dispersion obtained in the same manner as in Example B1, 126.4 g of a thermosetting acrylic resin (available from Hitachi Kasei K.K., Hitaloid 1007) and 205 g of ethyl cellosolve were mixed, to prepare a hard coating film-forming coating liquid (H-7).

Preparation of Substrate (F-7) with Hard Coating Film

A substrate (F-7) with a hard coating film was prepared by applying the hard coating film-forming coating liquid (H-7) by a bar coater method and then curing by heating at 80° C. for 1 minute in Example B1. The thickness of the hard coating film was 5 μm.

The resulting hard coating film was evaluated on the surface resistance, total light transmittance, haze, pencil hardness, scratch resistance and adhesion properties. The results are set forth in Table 2.

Example B8

Preparation of Inorganic Oxide Particle Group (3)

A mixture of 100 g of a silica sol having an average particle diameter of 5 nm and a SiO2 concentration of 20% by weight and 1900 g of pure water was heated to 80° C. This reaction mother liquor had pH of 10.5. To the mother liquor, 9000 g of a sodium silicate aqueous solution having a concentration of 1.17% by weight in terms of $SiO_2$ and 9000 g of a sodium aluminate aqueous solution having a concentration of 0.83% by weight in terms of $Al_2O_3$ were added at the same time. During the addition, the temperature of the reaction liquid was maintained at 80° C. Immediately after the addition, pH of the reaction liquid rose to 12.5, but thereafter, it hardly changed. After the addition was completed, the reaction liquid was cooled to room temperature and then washed by an ultrafilter to prepare a $SiO_2.Al_2O_3$ primary particle dispersion having a solids concentration of 20% by weight.

To 500 g of the primary particle dispersion, 1700 g of pure water was added, and the mixture was heated to 98° C. With maintaining this temperature, 50,400 g of sodium sulfate having a concentration of 0.5% by weight was added, and then 3,000 g of a sodium silicate aqueous solution having a concentration of 1.17% by weight in terms of $SiO_2$ and 9000 g of a sodium aluminate aqueous solution having a concentration of 0.5% by weight in terms of $Al_2O_3$ were added to obtain a dispersion of composite oxide fine particles (1).

Then, to 500 g of the dispersion of the composite oxide fine particles (1) having been made to have a solids concentration of 13% by weight by washing using an ultrafilter, 1,125 g of pure water was added, and concentrated hydrochloric acid (concentration: 35.5% by weight) was further added dropwise to adjust pH to 1.0 and to perform aluminum removal treatment. Then, with adding 10 liters of a hydrochloric acid aqueous solution of pH 3 and 5 liters of pure water, the dissolved aluminum salt was separated by an ultrafilter, to prepare a composite oxide fine particle (P-1) aqueous dispersion having a solids concentration of 20% by weight.

A mixture of 1500 g of the composite oxide fine particle (P-1) aqueous dispersion, 500 g of pure water, 1750 g of ethanol and 626 g of 28% ammonia water was heated to 35° C., and thereafter, 104 g of ethyl silicate ($SiO_2$: 28% by weight) was added to form a silica film. Then, the dispersion medium was replaced with water by an ultrafilter to prepare a silica-alumina particle (RB) dispersion having a $SiO_2.Al_2O_3$ concentration of 5% by weight. The average particle diameter of the silica-alumina particles (RC) was 40 nm.

The silica-alumina particle (RC) dispersion was adjusted to pH 4.0 by the use of dilute hydrochloric acid and then treated at 200° C. for 1 hour in an autoclave. To the dispersion, a cation exchange resin was added at room temperature, and they were stirred for 1 hour to perform dealkalization. After the cation exchange resin was separated, an anion exchange resin was added to the dispersion, and they were stirred for 1 hour to perform deanionization. Thus, an inorganic oxide (silica-alumina) particle group (3) dispersion having a $SiO_2.Al_2O_3$ concentration of 5% by weight was prepared. An average connection number of the inorganic oxide particle group (3) is set forth in Table 2. The $SiO_2/Al_2O_3$ molar ratio was 0.0019, and the refractive index was 1.28. The refractive index was measured in the following manner using CARGILL Series A, AA as standard refraction liquids.

Measurement of Refractive Index of Particles (1) A composite oxide dispersion is placed in an evaporator, and a dispersion medium is evaporated.

(2) The resulting concentrate is dried at 120° C. to obtain a powder.

(3) On a glass plate, two or three droplets of a standard refraction liquid whose refractive index has been already known are dropped, followed by mixing the droplets with the above powder.

(4) The above operations are carried out using various standard refraction liquids, and when the mixture becomes transparent, the refractive index of the standard refraction liquid used is taken as a refractive index of the fine particles.

Then, the inorganic oxide particle group (3) dispersion having a $SiO_2.Al_2O_3$ concentration of 5% by weight was concentrated to a $SiO_2.Al_2O_3$ concentration of 20% by weight, and then the dispersion was subjected to solvent replacement with methanol by an ultrafilter method to prepare an inorganic oxide particle group (3) methanol dispersion having a $SiO_2.Al_2O_3$ concentration of 20% by weight.

Preparation of Hard Coating Film-forming Coating Liquid (H-8).

With 271 g of the inorganic oxide particle group (3) methanol dispersion, 160 g of an ultraviolet curing resin (available from Dainippon Ink & Chemicals, Inc., Unidic 17-824-9, solids concentration: 79% by weight) and 171 g of ethyl cellosolve were mixed, to prepare a hard coating film-forming coating liquid (H-8).

Preparation of Substrate (F-8) with Hard Coating Film

A substrate (F-8) with a hard coating film was prepared in the same manner as in Example B1, except that the hard coating film-forming coating liquid (H-8) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Example B9

Preparation of Hard Coating Film-forming Coating Liquid (H-9)

With 316 g of the inorganic oxide particle group (3) methanol dispersion, 160 g of an ultraviolet curing resin (available from Dainippon Ink & Chemicals, Inc., Unidic 17-824-9, solids concentration: 79% by weight), 156 g of ethyl cellosolve and 632 g of an antimony pentaoxide particle dispersion (available from Catalysts & Chemicals Industries Co., Ltd., ELCOMPC-14, average particle diameter: 20 nm, $Sb_2O_5$ concentration: 20% by weight, dispersion medium: ethyl cellosolve/ethanol (34/66 by weight)) were mixed, to prepare a hard coating film-forming coating liquid (H-9).

Preparation of Substrate (F-9) with Hard Coating Film

A substrate (F-9) with a hard coating film was prepared in the same manner as in Example B1, except that the hard coating film-forming coating liquid (H-9) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Example B10

Preparation of Substrate (F-10) with Hard Coating Film

A substrate (F-10) with a hard coating film was prepared in the same manner as in Example B2, except that the hard coating film-forming coating liquid (H-2) was applied onto a triacetyl cellulose (TAC) film (thickness: 0.8 mm, refractive index: 1.50). The thickness of the hard coating film was 5 μm.

The resulting hard coating film was evaluated on the surface resistance, total light transmittance, haze, pencil hardness, scratch resistance and adhesion properties. The results are set forth in Table 2.

Example B11

Preparation of Substrate (F-11) with Hard Coating Film

A substrate (F-11) with a hard coating film was prepared in the same manner as in Example B4, except that the hard coating film-forming coating liquid (H-4) was applied onto a triacetyl cellulose (TAC) film (thickness: 0.8 mm, refractive index: 1.50). The thickness of the hard coating film was 5 μm.

The resulting hard coating film was evaluated on the surface resistance, total light transmittance, haze, pencil hardness, scratch resistance and adhesion properties. The results are set forth in Table 2.

Comparative Example B1

Preparation of Hard Coating Film-forming Coating Liquid (RH-1)

A hard coating film-forming coating liquid (RH-1) was prepared by mixing 160 g of an ultraviolet curing resin (available from Dainippon Ink & Chemicals, Inc., Unidic 17-824-9, solids concentration: 79% by weight) with 261 g of ethyl cellosolve.

Preparation of Substrate (RF-1) with Hard Coating Film

A substrate (RF-1) with a hard coating film was prepared in the same manner as in Example B1, except that the hard coating film-forming coating liquid (RH-1) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Comparative Example B2

Preparation of Hard Coating Film-forming Coating Liquid (RH-2)

A hard coating film-forming coating liquid (RH-2) was prepared by mixing 100 g of a thermosetting acrylic resin (available from Hitachi Kasei K.K., Hitaloid 1007) with 233 g of ethyl cellosolve.

Preparation of Substrate (RF-2) with Hard Coating Film

A substrate (RF-2) with a hard coating film was prepared in the same manner as in Example B1, except that the hard coating film-forming coating liquid (RH-2) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Comparative Example B3

Preparation of Substrate (RF-3) with Hard Coating Film

A substrate (RF-3) with a hard coating film was prepared in the same manner as in Comparative Example B1, except that the hard coating film-forming coating liquid (RH-1) was applied onto a triacetyl cellulose (TAC) film (thickness: 0.8 mm, refractive index: 1.50). The thickness of the hard coating film was 5 μm.

The resulting hard coating film was evaluated on the surface resistance, total light transmittance, haze, pencil hardness, scratch resistance and adhesion properties. The results are set forth in Table 2.

Comparative Example B4

Preparation of Hard Coating Film-forming Coating Liquid (RH-4)

A silica sol (available from Catalysts & Chemicals Industries Co., Ltd., SI-550, average particle diameter: 5 nm, $SiO_2$ concentration: 20% by weight, Na in silica: 2700 ppm) was subjected to solvent replacement with methanol by an ultrafilter method to prepare a methanol dispersion of silica fine particles having a solids concentration of 20% by weight.

Then, with 111.5 g of the methanol dispersion of silica fine particles, 160 g of an ultraviolet curing resin (available from Dainippon Ink & Chemicals, Inc., Unidic 17-824-9, solids concentration: 79% by weight) and 224 g of ethyl cellosolve were mixed, to prepare a hard coating film-forming coating liquid (RH-4).

Preparation of Substrate (RF-4) with Hard Coating Film

A substrate (RF-4) with a hard coating film was prepared in the same manner as in Example B1, except that the hard coating film-forming coating liquid (RH-4) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Comparative Example B5

Preparation of Hard Coating Film-forming Coating Liquid (RH-5)

A methanol dispersion of silica fine particles having a solids concentration of 20% by weight was prepared in the same manner as in Comparative Example B4.

Then, with 271 g of the methanol dispersion of silica fine particles, 160 g of an ultraviolet curing resin (available from Dainippon Ink & Chemicals, Inc., Unidic 17-824-9, solids concentration: 79% by weight) and 171 g of ethyl cellosolve were mixed, to prepare a hard coating film-forming coating liquid (RH-5).

Preparation of Substrate (RF-5) with Hard Coating Film

A substrate (RF-5) with a hard coating film was prepared in the same manner as in Example B1, except that the hard coating film-forming coating liquid (RH-5) was used. The thickness of the hard coating film was 5 μm.

The resulting hard coating film was evaluated on the surface resistance, total light transmittance, haze, pencil hardness, scratch resistance and adhesion properties. The results are set forth in Table 2.

Comparative Example B6

Preparation of Substrate (RF-6) with Hard Coating Film

A substrate (RF-6) with a hard coating film was prepared in the same manner as in Comparative Example B5, except that the hard coating film-forming coating liquid (RH-5) was applied onto a triacetyl cellulose (TAC) film (thickness: 0.8 mm, refractive index: 1.50,). The thickness of the hard coating film was 5 μm.

The resulting hard coating film was evaluated on the surface resistance, total light transmittance, haze, pencil hardness, scratch resistance and adhesion properties. The results are set forth in Table 2.

TABLE 2

Substrate with hard coating film

Hard coating film

| | | Matrix | | Inorganic compound particle group | | | $Sb_2O_5$ particles | | Total | | | | | | Surface |
|---|---|---|---|---|---|---|---|---|---|---|---|---|---|---|---|
| | | | | Average | | | | | | | | | | | resistance |
| | Sub-strate | Type | Content (wt %) | primary particle diameter (nm) | Connection number | Content (wt %) | Average particle diameter (nm) | Content (wt %) | Film thickness (μm) | light transmittance (%) | Haze (%) | Pencil hardness | Scratch resistance | Adhesion properties | (Ω/□) 1.E+10 |
| Ex. B1 | PET | UV curing resin | 85 | 12 | 10 | 15 | — | — | 5 | 91.5 | 1.5 | 4H | BB | BB | 1000 or more |
| Ex. B2 | PET | UV curing resin | 70 | 12 | 10 | 30 | — | — | 5 | 91.3 | 1.5 | 5H | AA | BB | 1000 or more |
| Ex. B3 | PET | UV curing resin | 30 | 12 | 10 | 70 | — | — | 5 | 91.1 | 1.6 | 4H | BB | BB | 1000 or more |
| Ex. B4 | PET | UV curing resin | 40 | 12 | 10 | 20 | 20 | 40 | 5 | 91.8 | 1.4 | 5H | AA | AA | 9 |
| Ex. B5 | PET | UV curing resin | 70 | 18 | 15 | 30 | — | — | 5 | 91.3 | 1.5 | 5H | AA | BB | 1000 or more |
| Ex. B6 | PET | UV curing resin | 40 | 18 | 15 | 20 | 20 | 40 | 5 | 91.8 | 1.5 | 5H | AA | AA | 7 |
| Ex. B7 | PET | acrylic resin | 70 | 12 | 10 | 30 | — | — | 5 | 91.2 | 1.6 | 4H | BB | BB | 1000 or more |
| Ex. B8 | PET | UV curing resin | 70 | 30 | 5 | 30 | — | — | 5 | 91.3 | 1.8 | 4H | AA | BB | 1000 or more |
| Ex. B9 | PET | UV curing resin | 40 | 30 | 5 | 20 | 20 | 40 | 5 | 91.4 | 1.8 | 5H | AA | AA | 12 |
| Ex. B10 | TAC | UV curing resin | 70 | 12 | 10 | 30 | — | — | 5 | 91.5 | 0.3 | 3H | BB | BB | 1000 or more |
| Ex. B11 | TAC | UV curing resin | 40 | 12 | 10 | 30 | 20 | 40 | 5 | 91.6 | 0.3 | 4H | BB | AA | 8 |
| Comp. Ex. B1 | PET | UV curing resin | 100 | — | — | — | — | — | 5 | 91.8 | 1.8 | H | DD | CC | 1000 or more |
| Comp. Ex. B1 | PET | acrylic resin | 100 | — | — | — | — | — | 5 | 91.7 | 1.8 | HB | DD | CC | 1000 or more |
| Comp. Ex. B1 | TAC | UV curing resin | 100 | — | — | — | — | — | 5 | 91.7 | 0.2 | HB | DD | CC | 1000 or more |
| Comp. Ex. B1 | PET | UV curing resin | 85 | 12 | 0 | 15 | — | — | 5 | 91.6 | 1.8 | H | CC | BB | 1000 or more |
| Comp. Ex. B1 | PET | UV curing resin | 70 | 12 | 0 | 30 | — | — | 5 | 91.5 | 1.8 | 2H | CC | BB | 1000 or more |
| Comp. Ex. B1 | TAC | UV curing resin | 70 | 12 | 0 | 30 | — | — | 5 | 91.4 | 0.3 | H | CC | BB | 1000 or more |

What is claimed is:

1. A chain inorganic oxide fine particle group comprising antimony pentaoxide fine particles which have an average particle diameter of 4 to 200 nm, are connected in the form of a chain and have an average connection number of 2 to 30.

2. The chain inorganic oxide fine particle group as claimed in claim 1, comprising antimony pentaoxide fine particles which have an average particle diameter of 5 to 50 nm and are connected in the form of a chain.

3. The chain inorganic oxide fine particle group as claimed in claim 2, wherein the chain fine particle group composed of antimony pentaoxide has a volume resistance value of 5 to 2000 Ω·cm.

* * * * *

UNITED STATES PATENT AND TRADEMARK OFFICE
CERTIFICATE OF CORRECTION

PATENT NO.         : 7,309,457 B2  
APPLICATION NO. : 10/981845  
DATED                  : December 18, 2007  
INVENTOR(S)        : Muraguchi et al.

Page 1 of 1

It is certified that error appears in the above-identified patent and that said Letters Patent is hereby corrected as shown below:

<u>Column 45</u>, Line 4 of Claim 3, "5 to 2000 Λ·cm" should read -- 5 to 200 Ω·cm --

Signed and Sealed this

Third Day of June, 2008

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,309,457 B2 | Page 1 of 1 |
| APPLICATION NO. | : 10/981845 | |
| DATED | : December 18, 2007 | |
| INVENTOR(S) | : Muraguchi et al. | |

It is certified that error appears in the above-identified patent and that said Letters Patent is hereby corrected as shown below:

Column 45, Line 50, Claim 3, "5 to 2000 $\Lambda\cdot cm$" should read -- 5 to 200 $\Omega\cdot cm$ --

This certificate supersedes the Certificate of Correction issued June 3, 2008.

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,309,457 B2 |
| APPLICATION NO. | : 10/981845 |
| DATED | : December 18, 2007 |
| INVENTOR(S) | : Muraguchi et al. |

It is certified that error appears in the above-identified patent and that said Letters Patent is hereby corrected as shown below:

<u>Column 45</u>, Line 50 of Claim 3, "5 to 2000 $\Lambda\cdot cm$" should read -- 5 to 2000 $\Omega\cdot cm$ --

This certificate supersedes all previously issued Certificates of Correction.

Signed and Sealed this

Eighth Day of July, 2008

JON W. DUDAS
*Director of the United States Patent and Trademark Office*